(12) United States Patent
Bozak

(10) Patent No.: US 12,207,606 B2
(45) Date of Patent: Jan. 28, 2025

(54) ELEVATED GARDEN PLANTER

(71) Applicant: John Bozak, Rochester, NH (US)

(72) Inventor: John Bozak, Rochester, NH (US)

(73) Assignee: Bozak Design LLC, Rochester, NH (US)

( * ) Notice: Subject to any disclaimer, the term of this patent is extended or adjusted under 35 U.S.C. 154(b) by 6 days.

(21) Appl. No.: 18/307,043

(22) Filed: Apr. 26, 2023

(65) Prior Publication Data

US 2023/0363324 A1 Nov. 16, 2023

Related U.S. Application Data

(60) Provisional application No. 63/336,119, filed on Apr. 28, 2022.

(51) Int. Cl.
*A01G 9/02* (2018.01)
*A01G 9/28* (2018.01)

(52) U.S. Cl.
CPC ........ *A01G 9/02* (2013.01); *A01G 9/28* (2018.02)

(58) Field of Classification Search
CPC . A01G 9/02; A01G 9/28; A01G 9/022; A01G 9/023; B65F 1/1415
See application file for complete search history.

(56) References Cited

U.S. PATENT DOCUMENTS

| | | | | |
|---|---|---|---|---|
| 2,942,823 A * | 6/1960 | Chapman | ............ | A01G 9/0291 248/97 |
| 4,768,845 A * | 9/1988 | Yeh | ............ | A47B 47/0008 312/263 |
| 5,070,645 A * | 12/1991 | Vaughn | ............ | A01G 9/02 47/72 |
| 5,136,807 A * | 8/1992 | Orlov | ............ | A01G 27/005 47/83 |
| 5,870,856 A * | 2/1999 | Friend | ............ | A47G 7/047 47/72 |

(Continued)

OTHER PUBLICATIONS

Adam Suchy, Division of Hazard Analysis; Product Instability or Tip-Over Injuries and Fatalities Associated with Televisions, Furniture, and Appliances: 2019 Report, Nov. 2019; https://www.cpsc.gov/s3fs-public/2019_Tip_Over_Report_0.pdf?kk87NU139Jb5NtMYAF.15ppcG4z0K66s, retrieved Apr. 25, 2023.

*Primary Examiner* — Tien Q Dinh
*Assistant Examiner* — William L Gmoser
(74) *Attorney, Agent, or Firm* — Sheehan Phinney Bass & Green PA

(57) ABSTRACT

An elevated garden planter has a container and support structure. The container has a frame and a fabric portion supported by the frame. The frame portion has rigid horizontal and vertical tubes and corner connectors to connect the tubes. Each rigid tube has a slit that extends lengthwise along the rigid tube. The fabric includes fabric side panels and a fabric bottom panel. A hem is at an upper edge of each respective one of the fabric side panels and a seam attaches adjacent pairs of fabric side panels to one another. Each hem is inside a corresponding one of the rigid horizontal tubes with its associated fabric side panels extending through the slit of that rigid horizontal tube. Each seam is inside a corresponding one of the rigid vertical tubes with its associated connected fabric side panels extending through the slit of that rigid vertical tube.

28 Claims, 20 Drawing Sheets

(56) References Cited

U.S. PATENT DOCUMENTS

| | | | | |
|---|---|---|---|---|
| 5,997,117 | A * | 12/1999 | Krietzman | H02B 1/301 |
| | | | | 403/219 |
| 6,223,917 | B1 * | 5/2001 | Bruder | A47B 47/0008 |
| | | | | 403/231 |
| 6,412,216 | B1 | 7/2002 | Harrison | |
| 6,622,425 | B2 | 9/2003 | Shephard | |
| 7,424,787 | B2 | 9/2008 | Singer | |
| 7,628,563 | B2 * | 12/2009 | Winkler | F16B 12/50 |
| | | | | 403/387 |
| 7,896,177 | B1 * | 3/2011 | Toma | A47B 47/0008 |
| | | | | 312/265.4 |
| D643,647 | S | 8/2011 | Owen et al. | |
| D658,538 | S | 5/2012 | Korzeniowski | |
| 8,125,055 | B2 | 7/2012 | Miller | |
| D716,689 | S | 11/2014 | Takaoka | |
| D734,207 | S | 7/2015 | Blouin | |
| D740,716 | S | 10/2015 | Fenn et al. | |
| 9,192,107 | B2 | 11/2015 | Adams | |
| D747,216 | S | 1/2016 | Cross | |
| D777,056 | S | 1/2017 | Cross | |
| 9,549,482 | B2 * | 1/2017 | Podemski | H05K 7/02 |
| 9,572,306 | B2 * | 2/2017 | Chiang | A01G 9/023 |
| 9,586,754 | B1 * | 3/2017 | Faacks | B65F 1/1452 |
| D801,853 | S | 11/2017 | Kramer et al. | |
| 10,070,593 | B2 | 9/2018 | Garrett | |
| D842,002 | S | 3/2019 | Ryan | |
| 10,351,155 | B1 | 7/2019 | Thuma et al. | |
| 10,568,276 | B1 * | 2/2020 | Fakhari | A01G 9/28 |
| 2005/0229866 | A1 * | 10/2005 | Simpson | A01K 1/033 |
| | | | | 119/499 |
| 2012/0144737 | A1 | 6/2012 | Austin | |
| 2013/0185993 | A1 | 7/2013 | Garrett | |
| 2017/0094912 | A1 | 4/2017 | Brooks | |

\* cited by examiner

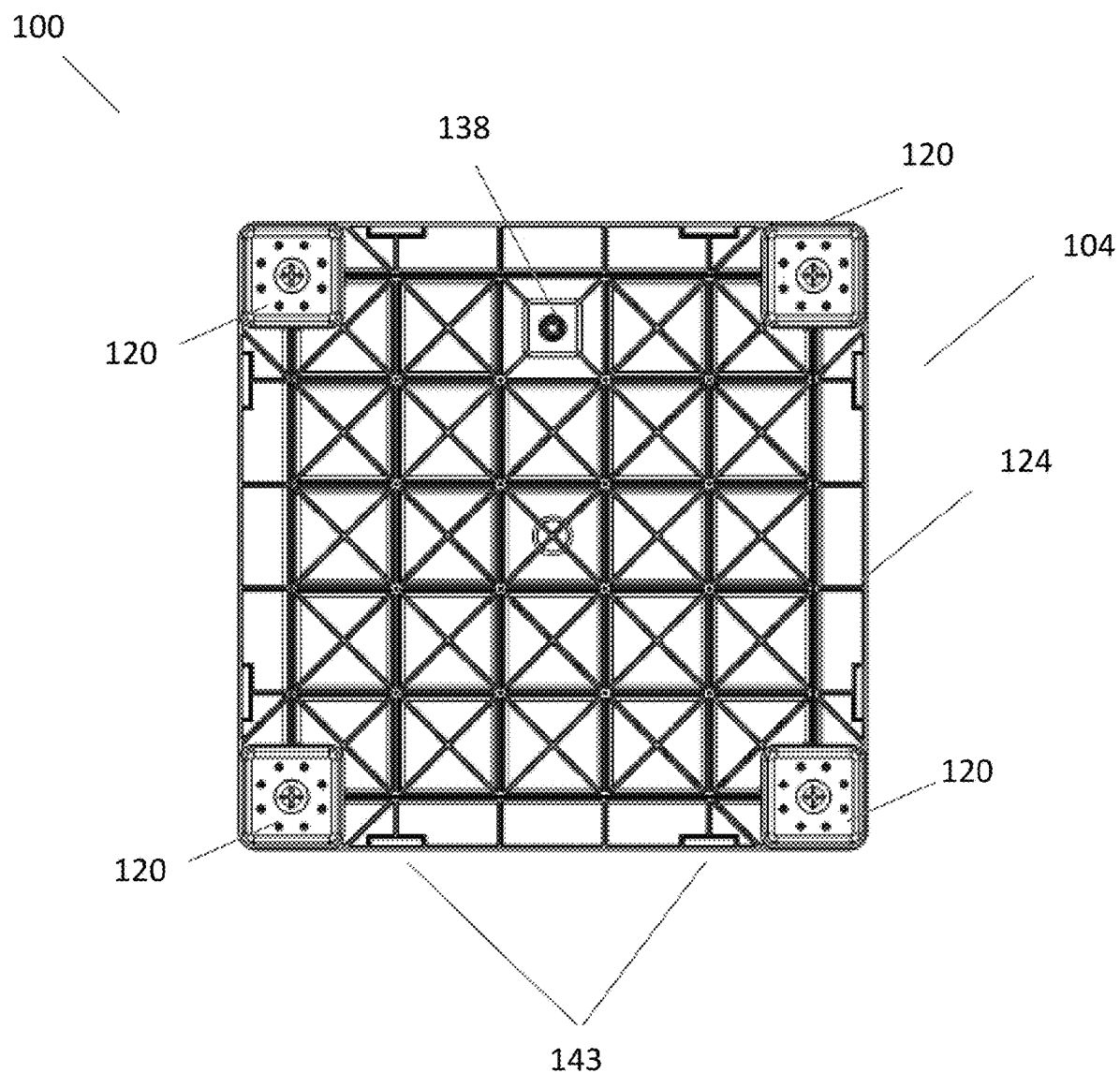
FIG. 6

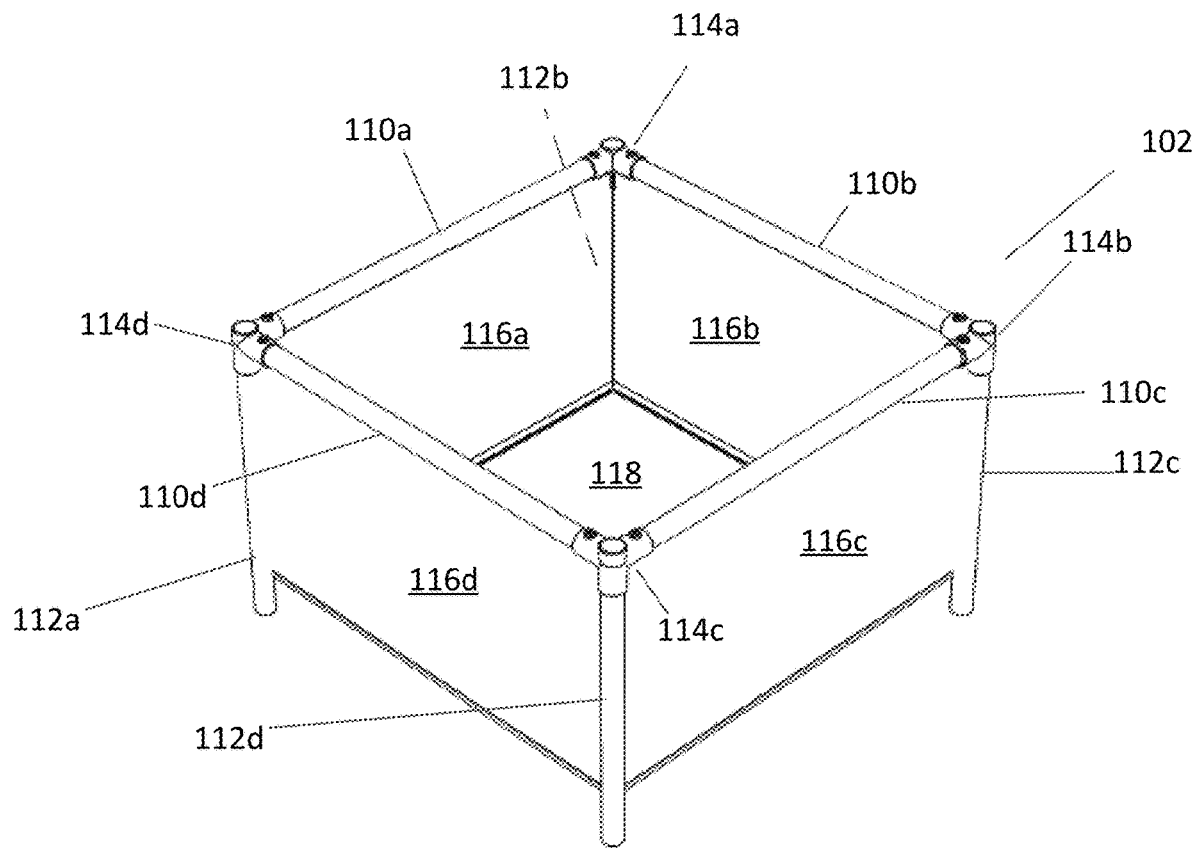
FIG. 7

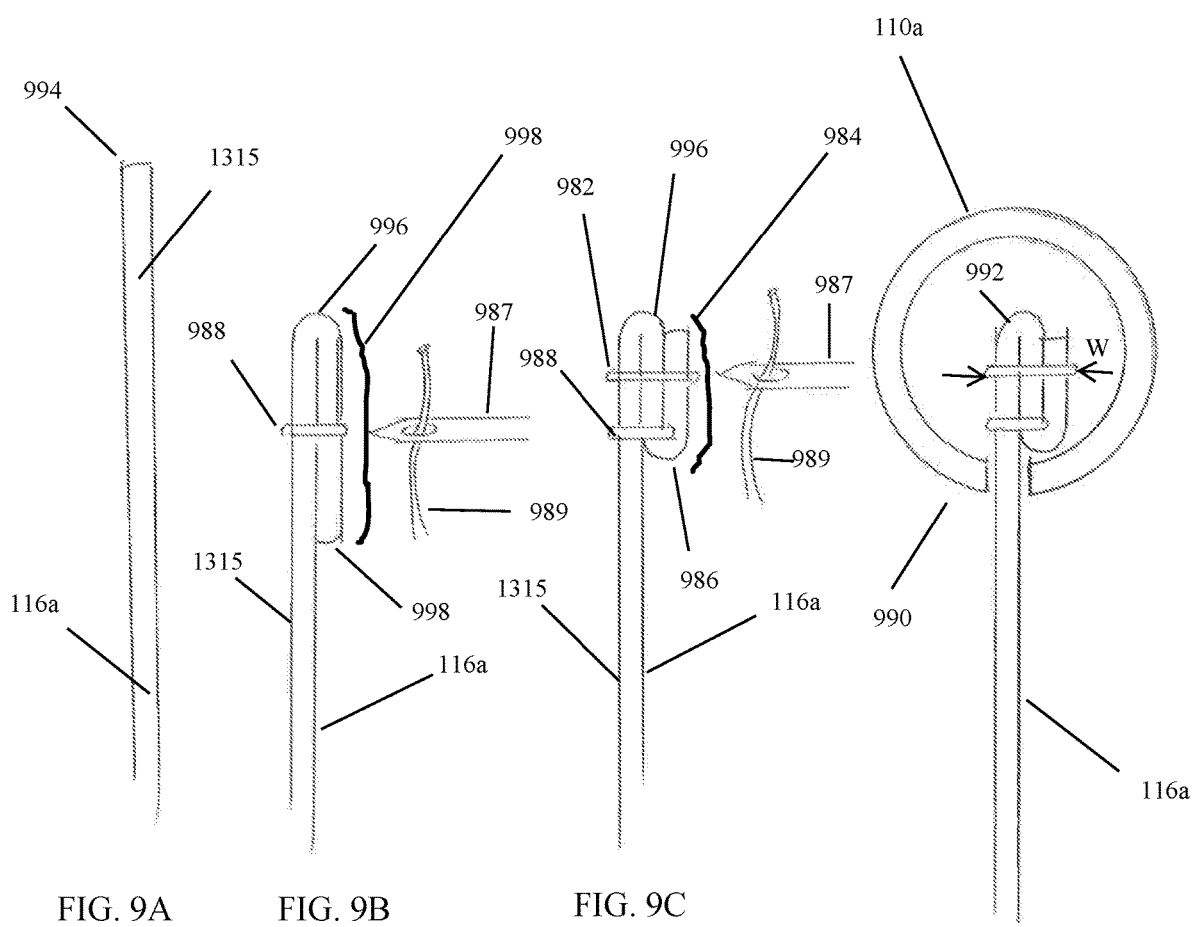

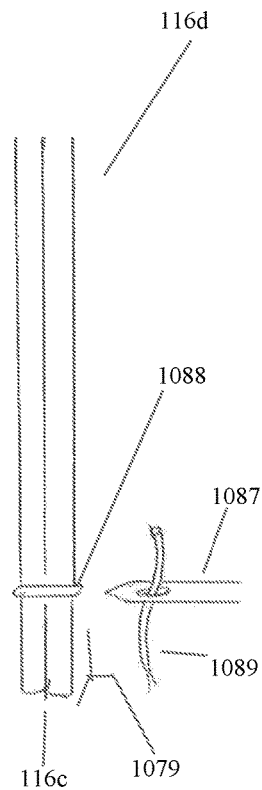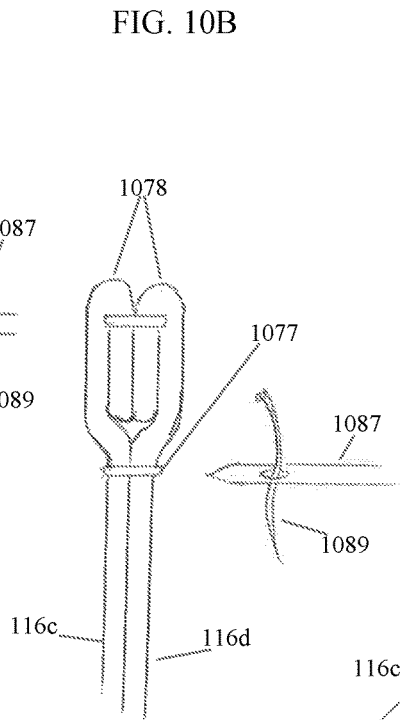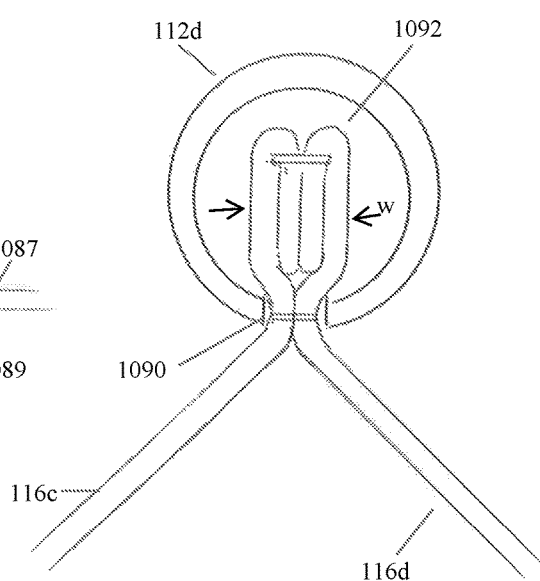

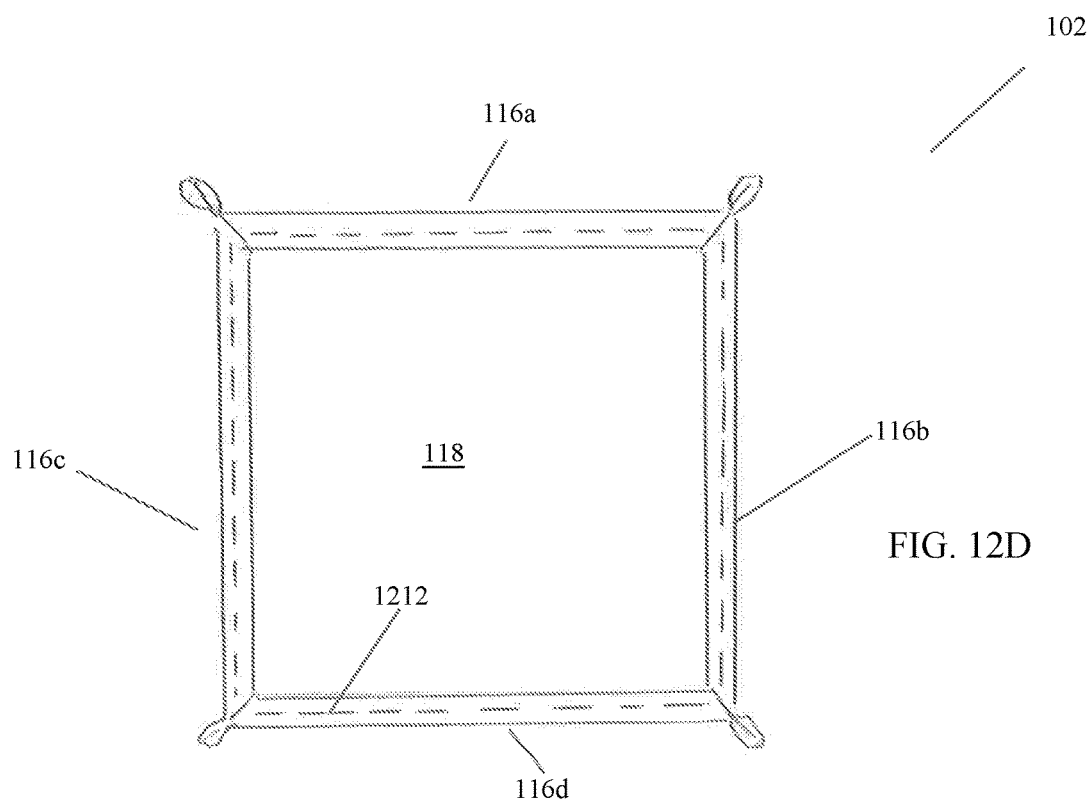
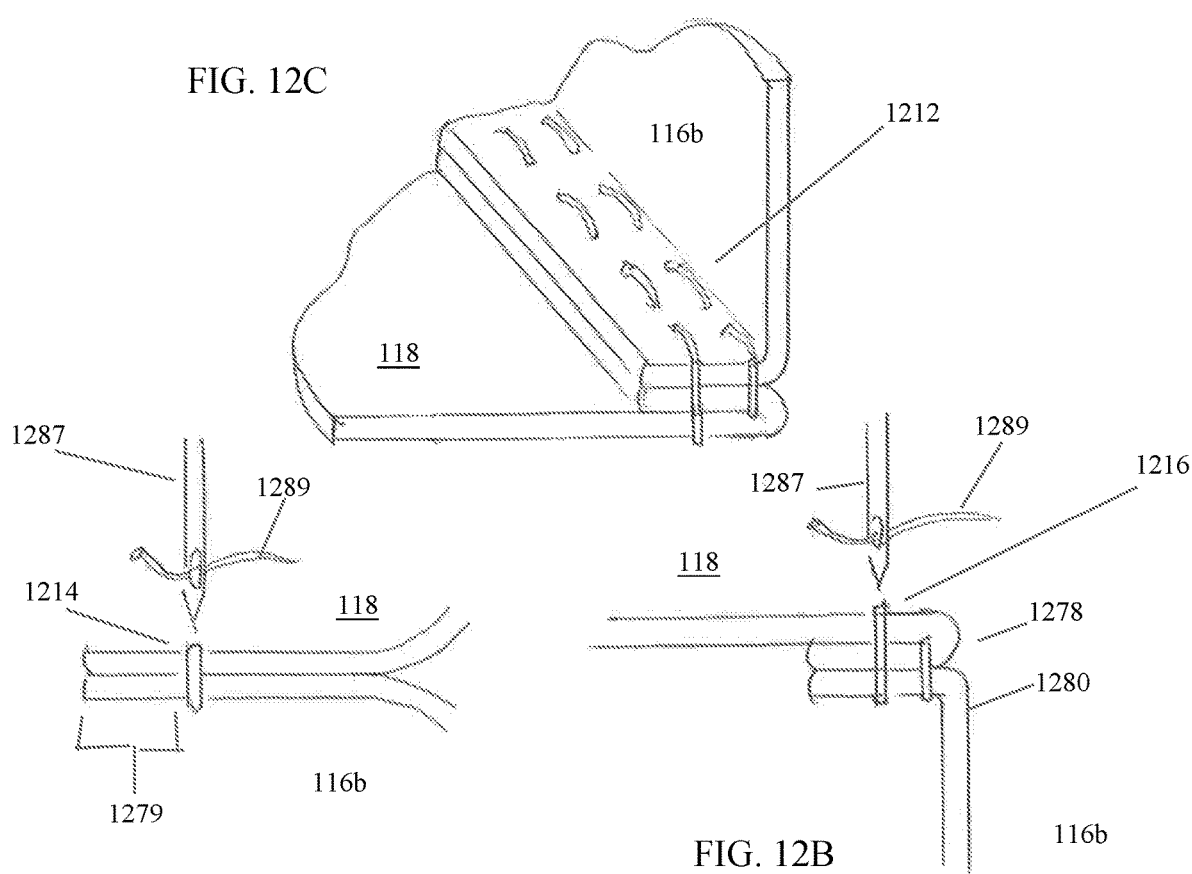
FIG. 12D
FIG. 12C
FIG. 12B
FIG. 12A

1414

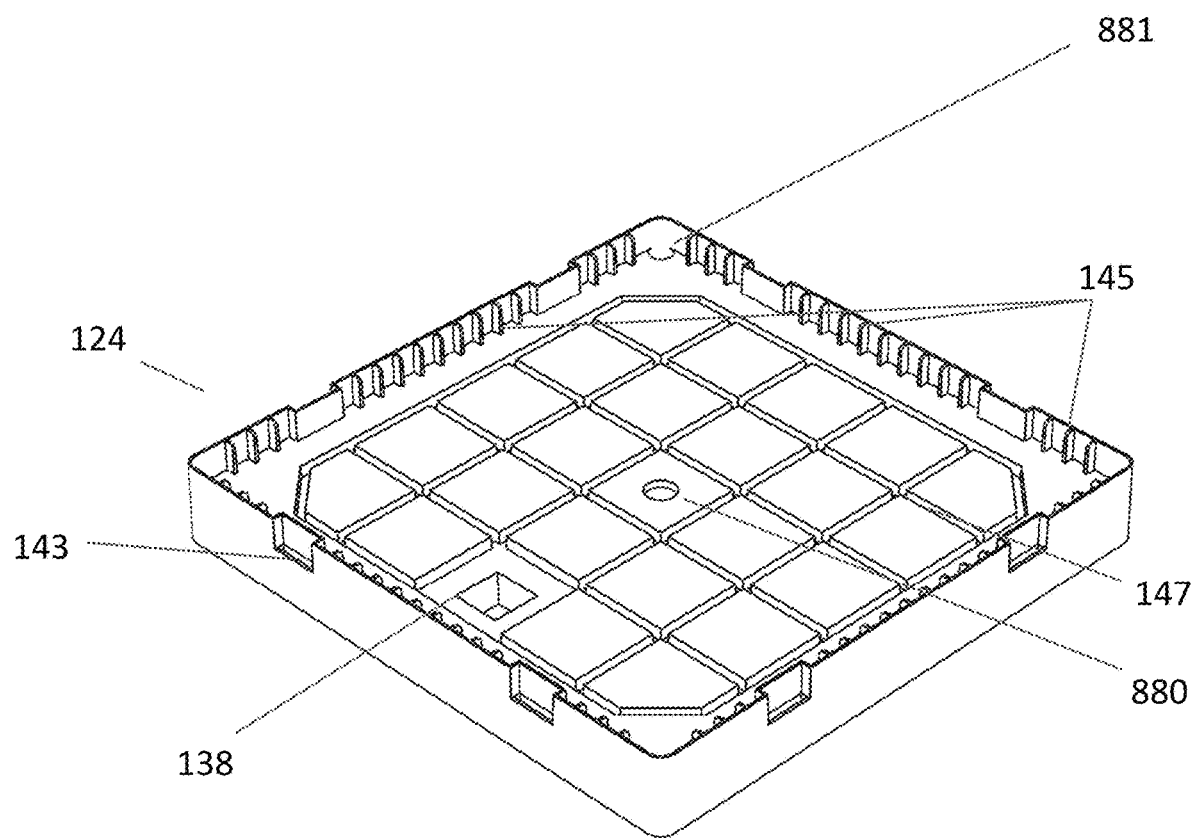
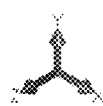
FIG. 16A

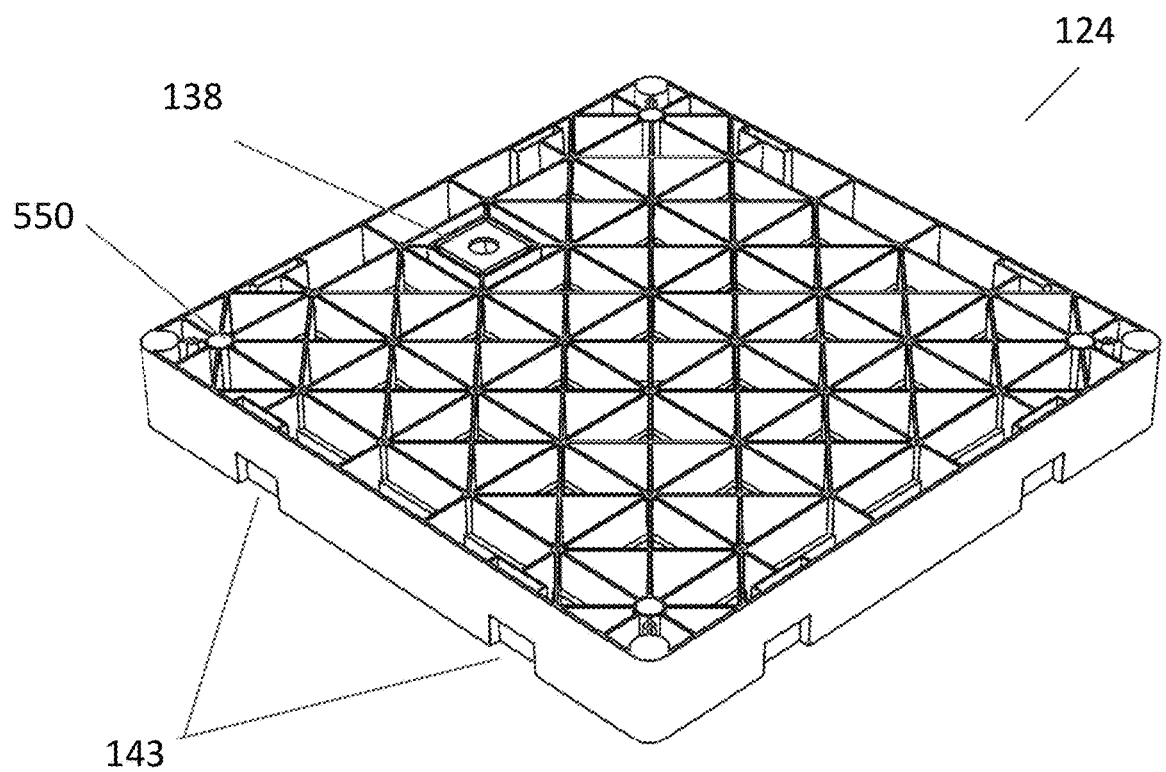
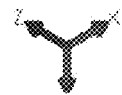
FIG. 16B

ELEVATED GARDEN PLANTER

CROSS-REFERENCE TO RELATED APPLICATION(S)

This application claims the benefit of U.S. Provisional Patent Application Ser. No. 63/336,119, filed Apr. 28, 2022, and entitled Elevated Garden Planter. The disclosure of the prior application is incorporated by reference herein in its entirety.

FIELD OF INVENTION

The present invention relates to an elevated garden planter and, more specifically, to an ergonomic elevated garden planter.

BACKGROUND

Historically gardens are planted directly in the ground. Almost all aspects of gardening from planting and weeding to harvesting require the gardener to bend over or kneel on the ground to work with the soil and the plants. Recently though, there has been a trend towards raised beds. Raised beds are boxes made of lumber that when filled with soil raise the bed surface off of the ground somewhat. Raised beds make food production slightly more accessible by requiring less bending but gardeners are still required to be close to or on the ground to do most of the work. For those with limited physical abilities including restrictions to bending or kneeling these approaches to gardening are off limits. A large part of our society is aging and may require elevated gardens to participate in gardening.

There are many competitive products on the market today and yet elevated gardening is not ubiquitous. The repeated use of traditional construction methods with boards and fasteners and other similar approaches has not created an advantage for the consumer. In general, overall investment is high and product life expectancy is low. Currently, the market has not provided an affordable, long lived option for elevated gardening. Consumers that can afford these items are bound by their cost and mechanical limitations. Price has created in essence an artificial limit to the widespread use of elevated gardens.

An opportunity exists to provide an affordable, safe, and practical elevated garden product that makes elevated gardening available not only to those with physical limitations but for people of all age groups and all income levels.

As there are few to no standards per se in this industry, existing products are limited by design. For example, shallow bed depths can limit a products use to the growing of shallow rooted plants as in U.S. Pat. No. 6,622,425 to Shepherd (2003).

Products are often complex assemblies with many parts and involve extensive assembly time. U.S. Pat. No. 10,070,593 to Garrett (2018) shows a large elevated garden that, once assembled, can be difficult to move and level.

Some products have no single drain point and are therefore incapable of collecting the irrigation runoff. These products can only be used outdoors or where there is no concern for mineral staining of the supporting surface. This can be seen in U.S. Pat. No. D643,647 S where the structure is made of wooden boards and has no centralized point to collect the irrigation runoff.

Presently there exist products for elevating a bed of soil or other plant growing medium at or near a height to provide to a standing user access to the growing surface without the need for the user to bend over.

There is a need, however, for improvements in elevated garden planters.

SUMMARY OF THE INVENTION

In one aspect, an elevated garden planter has a container and support structure. The container has a frame and a fabric portion supported by the frame. The frame portion has rigid horizontal and vertical tubes and corner connectors to connect the tubes. Each rigid tube has a slit that extends lengthwise along the rigid tube. The fabric includes fabric side panels and a fabric bottom panel. A hem is at an upper edge of each respective one of the fabric side panels and a seam attaches adjacent pairs of fabric side panels to one another. Each hem is inside a corresponding one of the rigid horizontal tubes with its associated fabric side panels extending through the slit of that rigid horizontal tube. Each seam is inside a corresponding one of the rigid vertical tubes with its associated connected fabric side panels extending through the slit of that rigid vertical tube.

In another aspect, a method of creating an elevated garden planter includes obtaining several rigid tubes (where each rigid tube has a slit that extends lengthwise along the rigid tube), obtaining several corner connectors, obtaining several fabric side panels connected together and to a fabric bottom panel. A hem is at an upper edge of each respective one of the fabric side panels, and a seam attaches each respective one of the fabric side panels to an adjacent one of the fabric side panels. The method includes coupling each of the seams and each of the hems to a corresponding one of the rigid tubes by sliding the seam or hem into the corresponding rigid tube such that the hem or seam is held inside the corresponding rigid tube and the associated pair of fabric side panels extends out from each respective one of the rigid tubes that contains one of the seams, and such that an associated one of the fabric side panel extends out from each respective one of the rigid tubes that contains one of the hems. The method further includes coupling the rigid tubes together with the corner connectors so that the rigid tubes that contain the hems are disposed horizontally and the rigid tubes that contain the seams are disposed vertically.

In some implementations, one or more of the following advantages are present.

For example, elevated gardens, such as the elevated garden planters disclosed herein, are differentiated from traditional "on-the-ground" and "raised bed" gardens because no bending or kneeling is required to access the growing surface.

Elevated gardens can be tended to while standing or in a wheelchair and as such offer greater access and ease to growing food for more people. This includes the elderly or anyone who has physical limitations that prevent them from bending or kneeling.

Space in an elevated garden tends not to be wasted with open rows and because dense bio-intensive planting techniques tend to have higher yields per square foot than traditional row planting on the ground. Substantial food can be produced without the need for large expanses of land. Soil, fertilizer, and water resources can be closely controlled and thereby conserved. Elevated gardens tend to have fewer pests and successful organic gardening without pesticides is possible.

Elevated gardens tend to be smaller in footprint and movable compared to gardens planted directly in the ground and as such they can be utilized within a wide variety of urban and suburban settings where traditional gardening may be difficult or impossible.

Elevated gardens are useful in many applications. They are used therapeutically at mental health, assisted living and nursing home facilities. They offer wheelchair access. They are used to teach agriculture in schools to all ages. They are useful in urban and suburban settings such as trailer parks, community gardens, roof top gardens, decks, patios, balconies, back yards, and for use in greenhouses.

The majority of prior products are made of wood which degrade with exposure to water and the environment and subsequently yield shorter product life spans. Some products do have waterproof liners or molded plastic containers to protect the wooden structure from direct soil/moisture contact but most of these liners are not set up to collect the irrigation runoff. There are considerable inefficiencies through waste and total energy required to harvest, process, shape, move, cut, handle, and assemble a product made of wood that can be greatly reduced using other manufacturing materials and methods.

Customers of various prior products encounter a wide range of product deficiencies including:
Extensive assembly time
Large number of parts
Short product longevity
Structural concerns that create potential crushing hazards from tipping or collapse.

In various implementations, the elevated garden planter disclosed herein solves some one or more (or all) of these (and potentially other) shortcomings associated with prior approaches. Moreover, in a typical implementation, the elevated garden planter disclosed herein provides value, affordability, longevity, and product safety.

Value

There is a strong and growing market demand for a high value elevated garden product that is economical, light weight, well-engineered, cost effective to manufacture, easy to assemble, low maintenance, and long lasting with features focused on the conservation and reuse of soils and water resources. This value proposition, if met, would help make elevated gardening common in the marketplace.

Affordability

A natural boundary to the popular use of a product is its cost. The lowest manufactured cost of this product is achieved through optimized component design that yields the fewest number of parts, the minimal use of materials, and the use of mass production techniques.

Longevity

The longevity of the product is optimized by two factors. First is the use of quality materials that can withstand years of direct freeze/thaw cycles and UV exposure. Second is thorough structural design that minimizes component stress through balanced load distribution and wherever possible load sharing between components.

Product Safety

Wetted soil can approach 100 pounds per cubic foot of volume. The support structure platform must perpetually resist deflection from these loads and transfer them evenly to the support structure legs and then down through the feet into to the ground. In addition, the support structure must resist all lateral loads that might otherwise cause it to collapse or tip.

As elevated gardens filled with wetted soil represent an enormous amount of potential energy. This energy can do bodily harm if allowed to tip-over or collapse on the user. Because of this concern, emphasis here is placed on designing the product for maximum stability and durability.

The US Consumer Product Safety Commission (NEISS) reports annually on product instability and tip-over injuries. Although there is no specific category dedicated to "Elevated Gardens" or the like, one can see the injuries reported by consumers from across the US, from products prone to tipping.

An estimated average of 27,100 people were treated annually in U.S. hospital emergency departments for product instability or tip-over injuries related to televisions, furniture, and appliances. The furniture category (which includes only furniture, or furniture and a TV, or furniture and an appliance), had the largest number of instability or tip-over-related injuries among the three product categories, with a national annual average estimate of 20,500 injuries (76 percent). Their 2019 report on product instability or tip-over injuries and fatalities can be viewed at the following site: www.cpsc.gov/s3fspublic/2019_Tip_Over_Report_0.pdf?kk87NU139Jb5NtMYAF.15ppcG4z0K66s&mod=article_inline Additionally, and more specifically, in various implementations, an elevated garden product is described herein that advantageously:
Raises a bed of soil to an ergonomic height for gardening while standing
Is designed with an ergonomically comfortable maximum reach in length and width
Provides a deep container for substantial soil bed depth with headroom for irrigation
Is wheelchair accessible for gardening
Transfers soil loads safely to the ground
Is stable from tipping and collapse
Has a low manufactured cost
Has a long product life
Is light weight for shipping and handling
Is collapsible and compact for shipping and or storage
Is affordable
Is quick and easy to assemble
Is easy to level, setup, and use
Is connectable to adjacent units allowing for a wide variety of configurations
Features a drain and sidewalls to capture and control irrigation runoff for reuse
May have multiple drains that can be linked together to collect runoff to a single point for reuse.

Other features and advantages will be apparent from the description and drawings, and from the claims.

BRIEF DESCRIPTION OF THE DRAWINGS

FIG. 6 is a bottom view of the elevated garden planter of FIG. 1.

FIG. 7 is a top perspective view of a container portion of the elevated garden planter of FIG. 1.

FIGS. 9A-9D show an implementation of steps to create a hem at an edge of a panel and to position the hem inside a tube.

FIGS. 10A-10C show an implementation of steps, in cross-section, to create a seam to connect adjacent panels and to position the seam inside a tube.

FIG. 12A shows an implementation of a bottom of a container portion of the elevated garden planter of FIG. 1.

FIG. 12B shows a partial, cross-sectional, perspective detail view of a seam at the bottom of the container portion in FIG. 12A.

FIGS. 12C and 12D show a sequence of steps, in cross-section, to create the seam of FIG. 12B.

FIG. 16A is a detailed top perspective view showing the platform.

FIG. 16B is a detailed bottom perspective view showing the platform.

Like reference characters refer to like elements.

DETAILED DESCRIPTION

Figure 1:
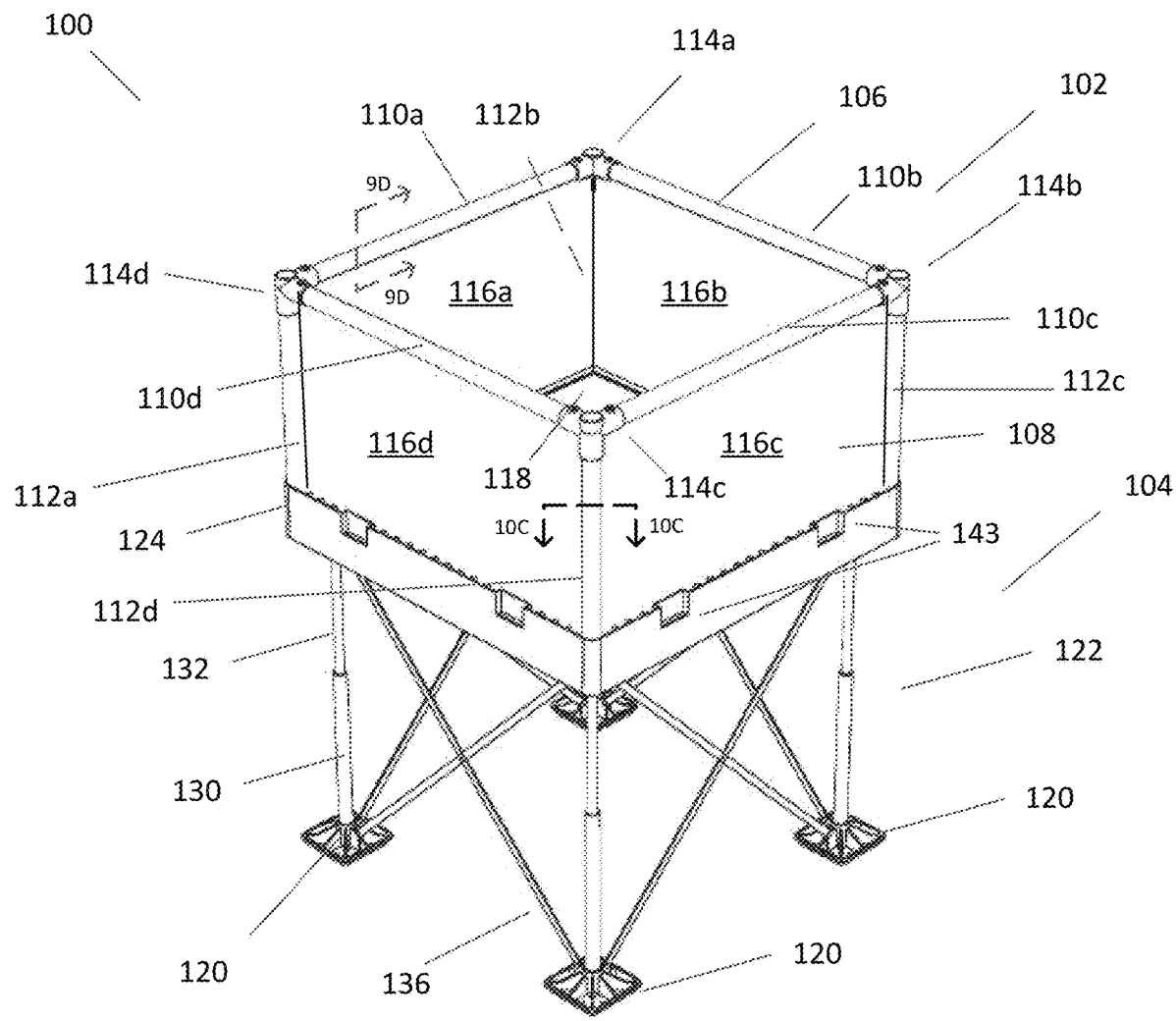
FIG. 1 is a top perspective view of an implementation of an elevated garden planter.

Implementations of the elevated garden planter described here is comprised of two separate parts that when combined work together to safely support a bed of soil for growing plants and manage irrigation runoff. The first part of the planter is a container for the soil or growing medium. The second part is the support structure. The support structure is used to safely raise the container of soil off the ground such that the soil surface is at a suitably ergonomic level for a standing user to access without bending over. The two parts interlock with one another to form a stable whole. The overall minimum size of the product is defined by the two ergonomic/human factor constraints described below.

The figures show an implementation of an elevated garden planter 100 that includes a container 102 and a support structure 104 for the container 102. Container 102 has a frame portion 106 and a fabric portion 108 supported by the frame portion 106. The support structure 104 has feet 120, a scaffold assembly 122 sitting atop the feet 120, and a support platform 124 sitting atop the scaffold assembly 122.

The frame portion 106 of container 102 has four rigid horizontal tubes 110a, 110b, 110c, 110d, four rigid vertical tubes 112a, 112b, 112c, 112d, and four corner connectors 114a, 114b, 114c, 114d. The fabric portion 108 of container 102 has four fabric side panels 116a, 116b, 116c, 116d, and a single fabric bottom panel 118. The fabric portions of container 102 are coupled to and supported by the rigid tubes in the manner described herein to define a box-shaped configuration that has a horizontal bottom and four vertical side walls.

The fabric portion 108 of the container is coupled to and supported by the frame portion 108. In one exemplary implementation, each rigid tube has a slit that extends lengthwise along its entirety. When the garden planter is in an assembled state, such as shown in FIG. 1 for example, the ends of the rigid tubes extend into tubular openings in the corner connectors, which restricts the size of the slit opening in the circumferential direction. In this state, the circumferential size of each slit is small enough to capture the seam or hem of a corresponding one of the fabric panels from slipping through the slit, but large enough to allow the thinner portion of the fabric panel (that is not part of a seam or hem) to extend through it.

One example of this arrangement is represented in FIG. 9D. That figure, which is a cross-sectional view, shows fabric side panel 116a coupled to and supported by rigid horizontal tube 110a. The rigid horizontal tube 110a has a slit 990, which, in the illustrated implementation, is a downward-facing slit. The slit 990 has a circumferential dimension (or size) that is small enough to capture the hem 992 at the upper end of the fabric side panel 116a and thereby prevent the hem 992 from slipping through the slit 990. However, slit 990 is large enough to allow the thinner (e.g., single ply) portion of the fabric side panel 116 (that is not part of the hem) to extend through slit 990. As such, the fabric side panel 110a, in the illustrated figure, is essentially hung by the rigid horizontal tube 110a.

In a typical implementation, the slit 990 in the illustrated rigid horizontal tube 110a would extend lengthwise (e.g., into and/or out of the page in FIG. 9D) along an entirety of the rigid horizontal tube 110a (from a first end thereof to a second end thereof). Moreover, as shown in FIG. 1, each end of the rigid horizontal tube 110a extends into a tubular opening in a corresponding one of the corner connectors. More specifically, the first end of the rigid horizontal tube 110a extends into a tubular opening in corner connector 114d, and a second of the rigid horizontal tube 110a extends into a tubular opening in corner connector 114a. The tubular openings in corner connector 114a and corner connector 114d are sized so as to maintain the circumferential dimension of the slit 990 (see FIG. 9D) substantially as shown. In various implementations, the circumferential dimension of the slit 990 may be between 1/16" and 3/4" (or may have an even broader range). The precise circumferential dimension of each slit (e.g., 990) may depend, for example, on the dimensions of the hem that is intended to be held inside the corresponding tube and the thickness of the fabric panels that are intended to extend out through the slit. More specifically, the circumferential dimension of each slit should be small enough to prevent the hem that is intended to be held inside the corresponding tube from being pulled through the slit, but large enough to allow the fabric panels intended to extend out through the slit to do just that.

Another example of this arrangement is represented in FIG. 10C. That figure, which is a cross-sectional view, shows fabric side panels 116c and 116d coupled to and supported by rigid vertical tube 112d. The rigid vertical tube 112d has a slit 1090, which, in the illustrated implementation, is an inward-facing slit. The slit 1090 has a circumferential dimension (or size) that is small enough to capture the seam 1092 between the fabric side panels 116c, 116d and thereby prevent the seam 1092 from slipping through the slit 1090. However, slit 1090 is large enough to allow the thinner (e.g., double ply) portion of the fabric side panels 116c, 116d (that are not part of the seam) to extend, side-by-side, through slit 1090. As such, the fabric side panels 116c, 116d, in the illustrated figure, are coupled to (and somewhat supported by) the rigid vertical tube 112d.

In a typical implementation, the slit 1090 in the illustrated rigid vertical tube 112a would extend lengthwise (e.g., into and/or out of the page in FIG. 10C) along an entirety of the rigid vertical tube 112a (from an upper end thereof to a lower end thereof). Moreover, as shown in FIG. 1 and FIG.

8, each end of the rigid horizontal tube 110*a* extends into a tubular opening (e.g., 881). More specifically, an upper end of the rigid vertical tube 112*a* extends into a downwardly-facing tubular opening in corner connector 114*c*, and a lower end of the rigid vertical tube 112*d* extends into a tubular or cylindrical recess (see, e.g., 881 in FIG. 8) in a corner of a support structure platform (that sits below the fabric portion 108 of the container 102). The downwardly-facing tubular opening in the corner connector 114*c* and the cylindrical recess in the corner of the support structure sized so as to maintain the circumferential dimension of the slit 1090 (see FIG. 10C) substantially as shown. In various implementations, the circumferential dimension of the slit 1090 is between 1/16" and 3/4" (or may have an even broader range). The precise circumferential dimension of each slit (e.g., 1090) may depend, for example, on the dimensions of the hem that is intended to be held inside the corresponding tube and the thickness of the fabric panels that are intended to extend out through the slit. More specifically, the circumferential dimension of each slit should be small enough to prevent the hem that is intended to be held inside the corresponding tube from being pulled through the slit, but large enough to allow the fabric panels intended to extend out through the slit to do just that.

Figure 13:
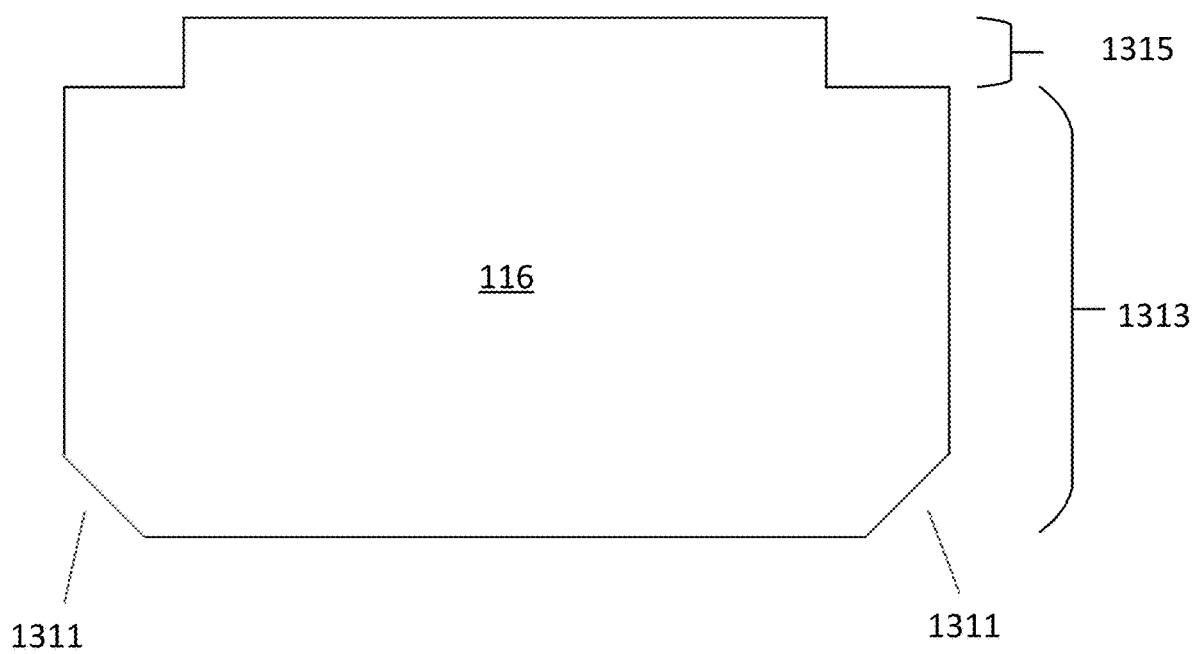
FIG. 13 is a side view of an implementation of a fabric side panel for a container.

In a typical implementation, each of the side panels 116*a*-116*d* is shaped to include a rectangular main portion and a rectangular top extension portion that extends in an upward direction from the rectangular main portion and is centered along a top edge of the rectangular main portion. An example of this is shown in FIG. 13, which shows a fabric side panel 116 (before it is formed into part of the fabric portion 108 of the container 102). The illustrated fabric side panel 116 has a rectangular main portion 1313 (with truncated bottom corners 1311) and a rectangular top extension portion 1315 that extends in an upward direction from the rectangular main portion 1313 and is centered along a top edge of the rectangular main portion 1313. The truncated bottom corners 1311 facilitate formation of the bottom corners of the fabric box.

In a typical implementation, each fabric side panel 116 is manipulated, and sewn, to form a hem (e.g., 992) along the upper edge of the rectangular top extension portion 1315 of the side panel 116. Moreover, in a typical implementation, the hem (e.g., 992) extends lengthwise across the entirety of the upper edge of the rectangular top extension portion 1315 from one end of the rectangular top extension portion 1315 to the other end of the rectangular top extension portion 1315. Hem 992 is sized to fit (and be captured) inside a corresponding one of the rigid horizontal tubes, while its associated fabric side panel 116 extends through the longitudinal slit in the rigid horizontal tube 110.

FIGS. 9A-9D show an implementation of steps to create a hem 992 at an edge of a fabric side panel 116*a* and to position the hem 992 inside a tube (e.g., 110*a*).

FIG. 9A shows a cross-sectional side view of an upper portion (e.g., the extension portion 1315) of the fabric side panel 116*a* itself including an upper edge 994 thereof. The upper portion of the fabric side panel 116*a* in that figure is disposed in a vertical configuration, with the upper edge 994 at the top of the fabric side panel 116*a* and facing up.

Hem 992 is formed in the upper portion of the fabric side panel 116*a* by bending the upper portion of the fabric side panel 116*a* (at 996) to create a first fold in a downward direction in the corresponding extension portion. The fabric that extends distally past that first bend 996, in a downward direction, defines a folded down part 998 of the extension portion 1315. Next, a first stitch 988 is placed through the folded down part of the extension portion and a non-folded down part of the extension portion 1315. (See FIG. 9B) In a typical implementation, the first stitch 988 extends lengthwise (e.g., in and/or out of the page in FIG. 9B) across an entirety of the extension portion 1315 from one end thereof to the other end thereof. In the illustrated implementation, the first stitch 988 is placed approximately halfway between the first bend 996 and the distal end of the extension portion 986, which is facing downward in FIG. 9B. The first stitch 988, according to the illustrated example, is formed with a needle 987 and thread 989.

Next, referring to FIG. 9C, the part of the extension portion 1315 that extends past the first stitch 988 is bent (at 986) to form a second fold in an upward directed in the corresponding extension portion 1315. Fabric that extends distally past the second bend (at 986) defines a folded up part 984 of the extension portion 1315. Next, a second lengthwise stitch 982 is formed through the folded up part 984 of the extension portion 1315, the folded down part 998 of the extension portion 1315, and the non-folded part of the extension portion 1315. In a typical implementation, the second stitch 982 extends lengthwise (e.g., in and/or out of the page in FIG. 9B) across an entirety of the extension portion 1315 from one end thereof to the other end thereof. In the illustrated implementation, the second stich 982 is placed between the first stich 988 and the first bend 996, for example. The second stitch 982, according to the illustrated example, is formed with a needle 987 and thread 989.

Once the hem 992 is formed at the upper edge of the extension portion 1315 of the first fabric side panel 116*a*, the hem 992 is slid in a lengthwise direction (e.g., into the page in FIG. 9D) into the first rigid horizontal tube 110*a*. The sliding continues until an entirety of the hem (from end to end) is inside the first rigid horizontal tube 110*a*. As the hem 922 slides through the first rigid horizontal tube 110*a*, a single-ply portion of the first fabric side panel 116*a* (which may be part of the extension portion or not) slides in the longitudinal direction (e.g., into the page in FIG. 9D) along the slit 990.

Once the entire hem 992 is inside the first rigid horizontal tube 110*a*, the ends of the first rigid horizontal tube 110*a* can be placed inside the corresponding cylindrical openings in the corner connectors 114*a*, 114*d* at either end thereof. In some implementations, the mating of the ends of the first rigid horizontal tube 110*a* to the corresponding cylindrical openings in the corner connectors 114*a*, 114*d* maintain the circumferential dimension of the slit 990. In some implementations, the mating of the ends of the first rigid horizontal tube 110*a* to the corresponding cylindrical openings in the corner connectors 114*a*, 114*d* reduces the circumferential dimension of the slit 990 (e.g., by 5%, 10%, 15%, etc.).

The hem 992 can be formed in a variety of ways—with a greater number of bends and/or stiches, and/or with a different configuration of bends and/or stiches. As long as the hem 992 has a width (i.e., the dimension labeled "W" in FIG. 9D) that is larger than the circumferential dimension of the slit 990 when the container 102 is formed, the desired functionality of supporting the first fabric side panel 116*a* with the first horizontal rigid tube 110*a* can be achieved.

In a typical implementation, there is a hem (e.g., 992) at the top of every side panel 116*a*, 116*b*, 116*c*, 116*d* and every hem 992 may be formed and configured in the same way as the other hems.

Additionally, each pair of adjacent fabric side panels (e.g., 116*c* and 116*d*) are manipulated, and sewn, to form a seam (e.g., 1092 in FIG. 10C) to join the two adjacent fabric side panels. In a typical implementation, the seam (e.g., 1092) extends lengthwise across the entirety of the connected side edges of the adjacent fabric side panels—from an upper end of the side edges to a lower end of the side edges. Seam 1092 is sized to fit (and be captured) inside a corresponding one of the rigid vertical tubes, while its associated fabric side panels (e.g., 116c and 116d) extend through the longitudinal slit in the rigid vertical tube.

FIGS. 10A-10C show an implementation of steps to create a seam 1092 to join the two adjacent fabric side panels 116c, 116d and to position the seam 1092 inside a tube (e.g., 112d).

FIG. 10A shows a cross-sectional side view of a side edged of two adjacent fabric side panels 116c, 116d. The two adjacent side panels 116c, 116d are side-by-side with the surfaces that will end up facing in an outward direction in the final container assembly in contact with one another. The ends of each adjacent side panel 116c, 116d are aligned with one another.

A first stich 1088 is placed through the two adjacent fabric side panels 116c, 116d as shown in FIG. 10A. In a typical implementation, the first stitch 1088 extends lengthwise (e.g., in and/or out of the page in FIG. 10A) across an entirety of the two adjacent fabric side panels 116c, 116d from one end thereof to the other end thereof. This attaches the two adjacent fabric side panels to one another. In the illustrated implementation, the first stich 1088 is placed close to (e.g., less than ¾ inch from) the aligned ends of the two adjacent fabric side panels 116c, 116d. The first stitch 1088, according to the illustrated example, is formed with a needle 1087 and thread 1089.

The first stitch 1088 effectively defines a distal portion 1079 of the adjacent fabric side panels that extend past the first stitch 1088. Next, referring to FIG. 10B, a first bend (at 1078) is formed in each of the adjacent fabric side panels, away from the other adjacent fabric side panel, to cover and extend past the distal portion 1079 of the adjacent fabric side panel.

A second stitch 1077 is then formed to extend once through both of the adjacent fabric side panels 116c, 116d just beyond the end of the distal portion 1079 of the adjacent fabric side panels, as shown in FIG. 10B. In a typical implementation, the second stitch 1077 extends lengthwise (e.g., in and/or out of the page in FIG. 10B) across an entirety of the two adjacent fabric side panels 116c, 116d from one end thereof to the other end thereof. The second stitch 1077, according to the illustrated example, is formed with the needle 1087 and thread 1089.

Once seam 1092 is formed to connect the adjacent fabric side panels 116c, 116d, the seam 1092 is slid in a lengthwise direction (e.g., into the page in FIG. 10C) into the rigid vertical tube 112d. The sliding continues until an entirety of the seam (from end to end) is inside the rigid vertical tube 112d. As the seam 1092 slides through the rigid vertical tube 112d, a single ply of each of the two adjacent side panels 116c, 116d (e.g., at or near the second stitch 1077) slides in the longitudinal direction (e.g., into the page in FIG. 10C) along the slit 1090.

Once the entire seam 1092 is inside the rigid vertical tube 112d, the top of the rigid vertical tube 112d can be placed inside a corresponding downward-facing cylindrical opening in corner connector 114c and the bottom of the rigid vertical tube 112d can be placed inside a corresponding cylindrical opening in a corner of support platform 124. In some implementations, the mating of the ends of the rigid vertical tube 112d to the corresponding cylindrical openings maintain the circumferential dimension of the slit 1090. In some implementations, the mating of the ends of the rigid vertical tube 112d to the corresponding cylindrical openings reduces the circumferential dimension of the slit 1090 (e.g., by 5%, 10%, 15%, etc.).

The seam 1092 can be formed in a variety of ways—with a greater number of bends and/or stiches, and/or with a different configuration of bends and/or stiches. As long as the hem 1092 has a width (i.e., the dimension labeled "W" in FIG. 10C) that is larger than the circumferential dimension of the slit 1090 when the container 102 is formed, the desired functionality of helping to support the fabric side panels 116c, 116d with the rigid vertical tube 112d can be achieved. In a typical implementation, there is a seam (e.g., 1092) joining every pair of adjacent side panels (116a-116b, 116b-116c, 116c-116d, and 116d-116a) and every seam 1092 may be formed and configured in the same way as the other seams.

Figure 11:
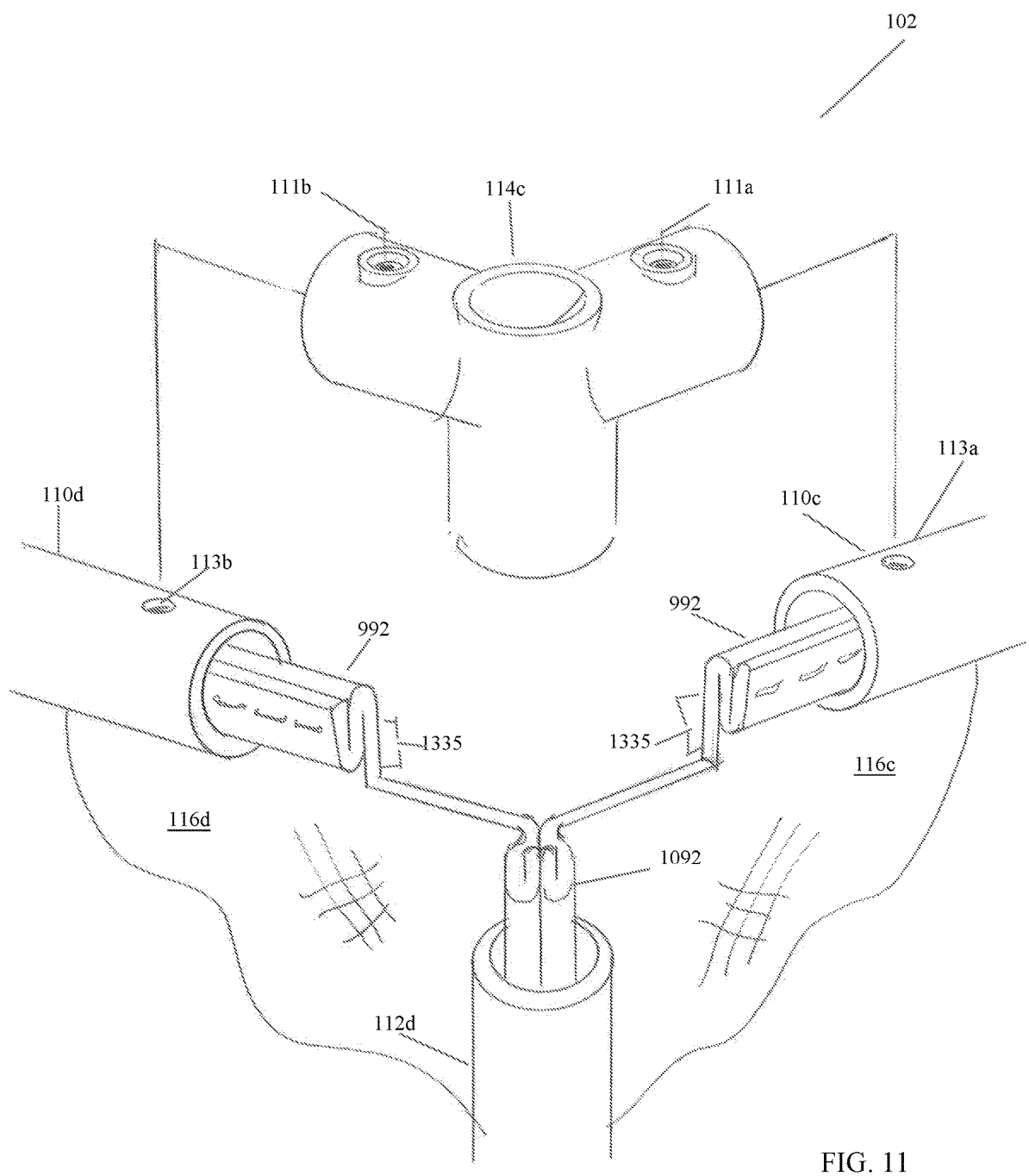
FIG. 11 is a partially exploded detail view of a corner of a container portion of the elevated garden planter of FIG. 1.

FIG. 11 is a detailed, partially-exploded view showing an exemplary corner of container 102.

More specifically, the illustrated view shows two adjacent fabric side panels 116c and 116d connected to one another by a seam 1092. Seam 1092 sits, at least partially, inside the rigid vertical tube 112d and the fabric side panels 116c, 116d extend out from rigid vertical tube 112d through the longitudinal slit (not visible in FIG. 11) in the rigid vertical tube.

Hem 992 is formed in the upper extension portion 1315 of each of the adjacent fabric side panels 116c, 116d. Each hem 992 sits, at least partially, inside a corresponding one of the rigid horizontal tubes 110c, 110d.

The corner connector 114c has three openings for receiving the rigid tubes 110c, 110d, and 112d. The openings (not visible in FIG. 11) are orthogonal to one another so that when the rigid tubes 110c, 110d, and 112d are placed inside of the openings, the rigid tubes are orthogonal to one another as well. More specifically, two of the openings in the corner connector lie on horizontal axes, orthogonal to one another, and are configured to receive the rigid horizontal tubes 110c, 110d. Moreover, one of the openings in the corner connector 114c lies on a vertical axis, is downward-facing and configured to receive the rigid vertical tube 112d. Each of these openings in the corner connector 114c is formed by surfaces that follow a cylindrical path.

Moreover, the downward-facing opening in the corner connector 114c has a longitudinal (up and down) slit (not visible in FIG. 11 but see 1417 in FIG. 14A) that extends in an upward direction from the end of the surface that defines the downward-facing opening. The slit extends in a longitudinal direction and is configured to allow portions of the panels 116c, 116d to extend out from the corner connector 114c while the upper end of the seam 1092 is inside the corner connector 114c.

Once the corner connector 114c has been so positioned (e.g., with the upper end of the seam 1092 is inside the corner connector 114c and portions of the panels 116c, 116d extending out through the slit in the corner connector 114c), the rigid horizontal tubes 110c, 110d are slid into the horizontal openings in the corner connector 114c. There are two circular openings 1111a, 1111b in the tops of the corner connector 114c that align with corresponding openings 1113a, 1113b in the tops of the rigid horizontal tubes 110c, 110d. These openings are configured to receive fasteners (e.g., screws or bolts) to hold the rigid horizontal tubes 110c, 110d and the corner connector 114c together. In a typical implementation, the openings 1113a, 1113b in the tops of the rigid horizontal tubes 110c, 110d may be threaded. Notably, the openings 1113a, 1113b in the tops of the rigid horizontal tubes 110c, 110d are diametrically opposed to the positions of the longitudinal slits (which open in a downward direction) in those rigid horizontal tubes 110c, 110d.

In a typical implementation, the portions of the corner connector 114c that define the horizontal opening extend out to near (but obviously not past) the extension portions 1335 of the fabric side panels 116c, 116d. In some implementations, in fact, those portions of the corner connector 114c extend right up to the edges (visible in FIG. 11) of the hems 992 formed in the extension portions 1335. The rigid horizontal tubes 110c, 110d, meanwhile, get slid beyond the ends of the hems 992 and into the cylindrical openings in the corner connector 114c.

The corner configuration can vary somewhat from the implementation represented in FIGS. 12A-12c. For example, FIGS. 14A and 14B shows an alternative implementation of a corner connector 1414 that may be used, for example, in place of the corner connectors 114a-114d in FIG. 1.

Figure 14A:
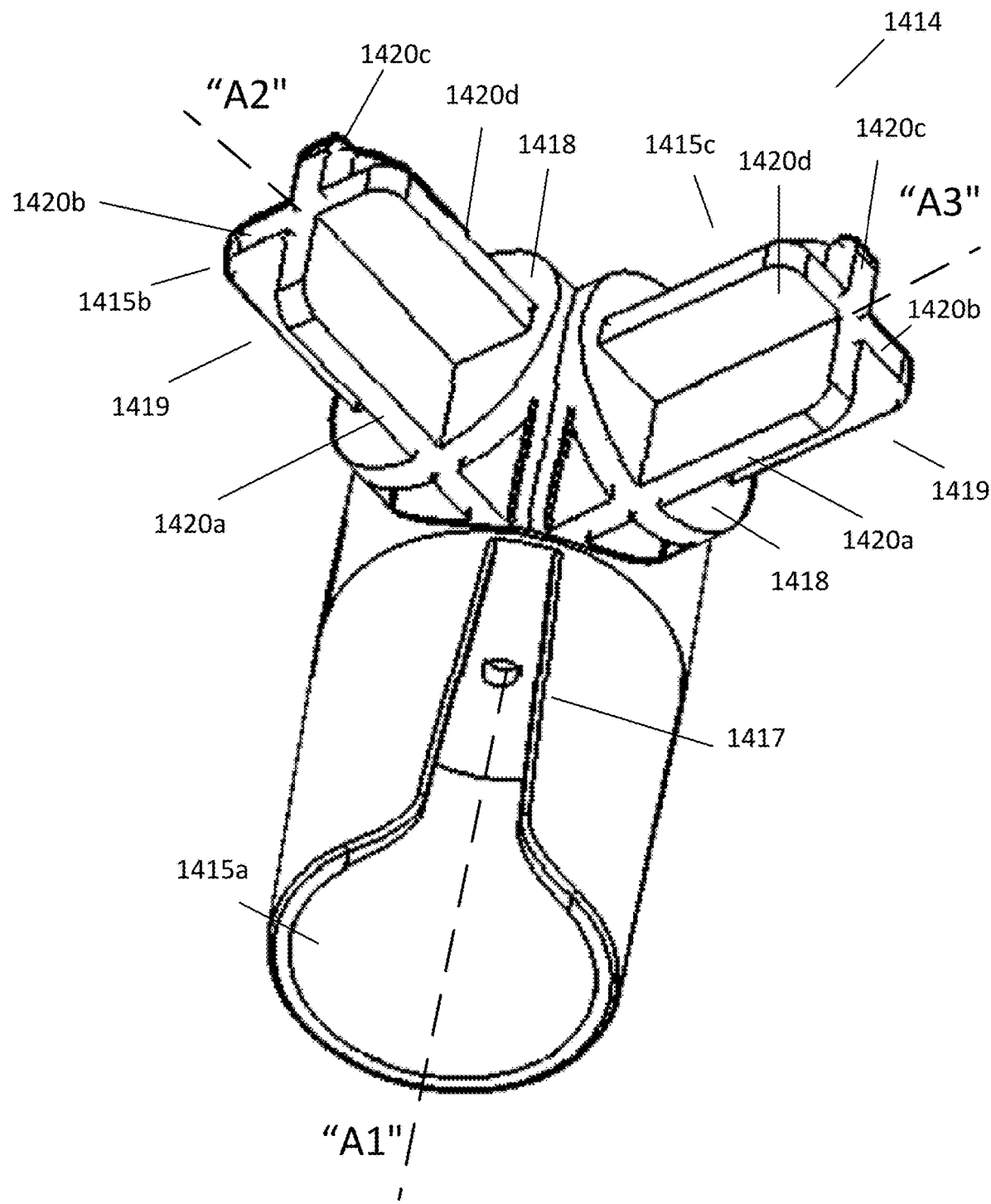
FIG. 14A is a perspective bottom view of an implementation of a corner connector.
Figure 14B:
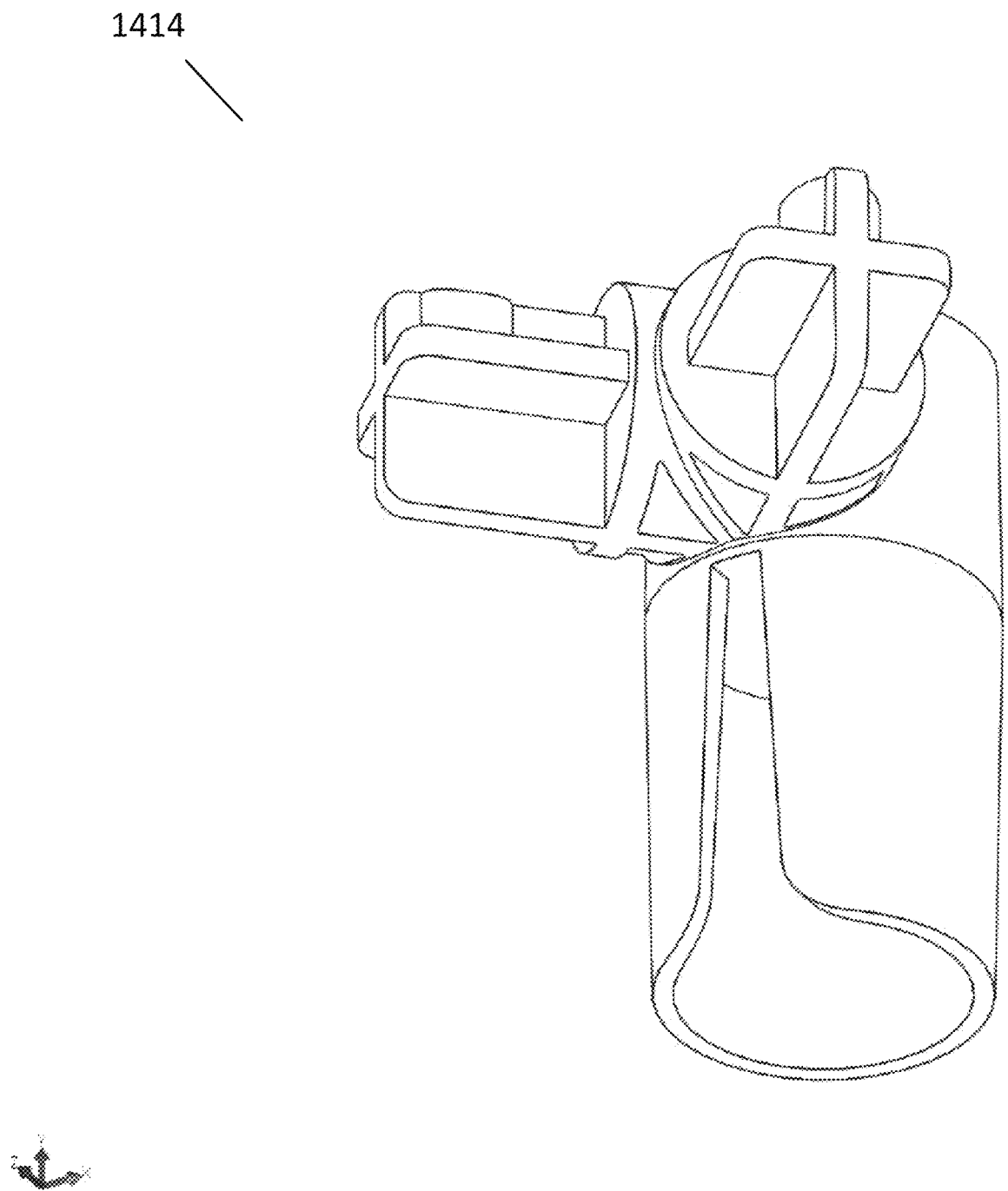
FIG. 14B is a perspective top view of an implementation of the corner connector.

Unlike the corner connectors 114a-114d in FIG. 1, the corner connector 1414 in FIGS. 14A and 14B does not have three openings for receiving the rigid tubes (e.g., 110, 112) of a container. Instead, the corner connector 1414 in FIGS. 14A and 14B has three tube engagers (1415a, 1415b, 1415c), one of which is an opening 1415a for receiving one of the rigid vertical tubes (e.g., 112a in FIG. 1) and two of which are coupling elements 1415b, 1416c that are configured to extend into and engage (e.g., via friction) corresponding ones of the rigid horizontal tubes (e.g., 110a or 110d in FIG. 1). Each tube engager 1415a, 1415b, and 1415c in FIGS. 14A and 14B has its own axis labeled A1, A2, and A3, respectively. Like the connectors (e.g., 114a) in FIG. 1, the tube engager axes A1, A2, and A3 are orthogonal to one another so that when the rigid tubes (e.g., 110c, 110d, and 112d) are coupled to the tube engagers 1415a, 1415b, 1415c, the rigid tubes are held in an orthogonal relationship to one another. More specifically, when an exemplary container is assembled using the illustrated corner connector 1414, the axes A2 and A3 of the two coupling elements 1415b, 1415c of the corner connector 1414 may be horizontally disposed and, in which case, the axis A1 of the opening 1415a would be vertically disposed. In that sort of configuration, the ends of rigid horizontal tubes (e.g., 110a and 110d) would have been slid over the coupling elements 1415b and 1415c and the end of a vertical tube (e.g., 112a) would have been slid into the opening 1415a.

Figure 15:
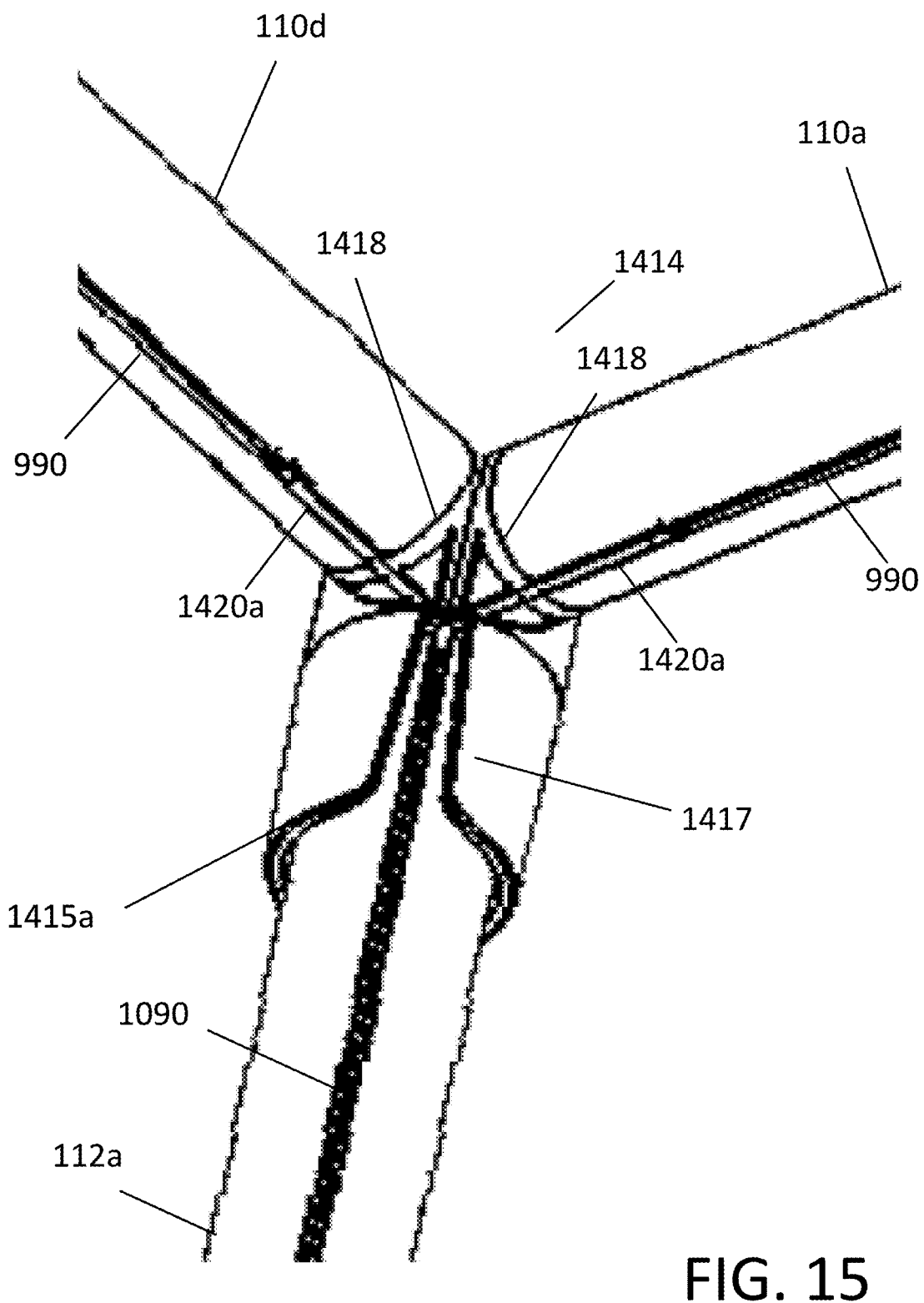
FIG. 15 is a detailed perspective view showing parts of a corner of a container.

The tube engager 1415a with the opening 1415a has surfaces that define a tube with an axial slit 1417 that extends from a distal end of the tube along its length. The slit 1417 is in a surface of the tube that faces inwardly when the container is assembled. When the container is assembled, slit 1417 in the tube would align with a corresponding slit in the rigid vertical tube (e.g., 112a) that gets coupled to the tube engager 1415a. An example of this is shown in FIG. 15, which shows the slit 1417 in the tube engager 1415a of corner connector aligned with a corresponding slit 1090 in the rigid vertical tube 112a that is coupled to (i.e., slid inside) the tube engager 1415a. In the configuration of FIG. 15, the fabric side panels would extend out from slit 1090 all the way up to the top of the slit 1417.

Referring again to FIGS. 14A and 14B, each coupling element 1415b, 1415c has surfaces that define a flat base 1418 that is perpendicular to its axis (A2 or A3) and a cross-shaped (in cross-section) projection 1419 extending out from the flat base 1418. The cross-shaped projection 1419 has four arms 1420a-1420d that are perpendicular to one another. Only one of the four arms (1420a) extends radially outward (relative to axis A2 or A3) all the way to an outer edge of the flat base 1418. The other three arms (1420b-1420d) stop short of the outer edge of the flat base 1418, leaving a portion of the flat base 1418 exposed radially outward from those three arms (1420b-1420d). The arm (1420a) that extends radially outward all the way to the outer edge of the flat base 1418 is the arm that would align with the slit (e.g., 990 in FIG. 9, see also FIG. 15) in a corresponding one of the rigid horizontal tubes (e.g., 110a or 110d) of the container. An example of this is shown in FIG. 15.

In FIG. 15, each of the cross arms 1420a that extends radially outward all the way to the outer edge of one of the flat bases 1418 of the corner connector 14141 is aligned with a corresponding slit 990 in one of the rigid horizontal tubes (e.g., 110a or 110d). More specifically, that cross arm 1420a sits within slit 990 in the rigid horizontal tube (110a or 110d). This mating of the cross arm 1420a to the slit 990 helps ensure proper alignment of the rigid horizontal tubes 110a, 110d relative to the corner connector 1414 and, more specifically, helps ensure proper alignment of the slits 990 in the rigid horizontal tubes 110a, 110d relative to the slit 1417 in the corner connector 1417 and relative to the slit 1090 in the rigid vertical tube 112a. As shown in the figure, each slit 990 in one of the rigid horizontal tubes 110a, 110d is aligned with (or at least very close to being aligned with) the slit 1090 in the rigid vertical tube 112a. The phrase "at least very close," as used herein, means that any offset from being precisely aligned is miniscule (such that two slits would be no more than ⅛", no more than 1/16", or no more than 1/32" away from one another if the slits were extended in a straight line along their respective axes to come as close as possible to touching one another). This alignment (or at least substantial alignment) of slits helps ensure that the fabric side panels that are held in place and supported by the tubes are smooth in appearance, straight, and appear aesthetically appealing.

This is only one example of how the coupling elements 1415b, 1415c may be configured. Instead of the cross-shaped projection, the coupling elements can include virtually any kind of structural that is able to fit inside and engage (frictionally or otherwise) a corresponding one of the rigid horizontal tubes (e.g., 110a). The shape could be a solid tubular or tapered tube shape, a cage shape, or any other suitable shape.

Referring again to FIG. 11, the illustrated corner connector 1414 has two coupling elements 1415b, 1415c and one tubular piece that defines opening 1415a, in various implementations, the corner connector 1414 could have any number (up to three) of either type of tube engager.

Moreover, the downward-facing opening in the corner connector 114c has a longitudinal (up and down) slit (not visible in FIG. 11 but see FIGS. 14A and 14B) that extends in an upward direction from a lower edge of the surface that defines the downward-facing opening. The slit extends in a longitudinal direction and is configured to allow portions of the panels 116c, 116d to extend out from the corner connector 114c while the upper end of the seam 1092 is inside the corner connector 114c.

Once the corner connector 114c has been so positioned (e.g., with the upper end of the seam 1092 is inside the corner connector 114c and portions of the panels 116c, 116d extending out through the slit in the corner connector 114c), the rigid horizontal tubes 110c, 110d are slid into the horizontal openings in the corner connector 114c. There are two circular openings 1111a, 1111b in the tops of the corner connector 114c that align with corresponding openings 1113a, 1113b in the tops of the rigid horizontal tubes 110c, 110d. These openings are configured to receive fasteners (e.g., screws or bolts) to hold the rigid horizontal tubes 110c, 110d and the corner connector 114c together. In a typical implementation, the openings 1113a, 1113b in the tops of the rigid horizontal tubes 110c, 110d may be threaded. Notably, the openings 1113a, 1113b in the tops of the rigid horizontal tubes 110c, 110d are diametrically opposed to the positions of the longitudinal slits (which open in a downward direction) in those rigid horizontal tubes 110c, 110d.

In a typical implementation, the portions of the corner connector 114c that define the horizontal openings extend out to near (but obviously not past) the extension portions 1335 of the fabric side panels 116c, 116d. In some implementations, in fact, those portions of the corner connector 114c extend right up to the edges (visible in FIG. 11) of the hems 992 formed in the extension portions 1335. The rigid horizontal tubes 110c, 110d, meanwhile, get slid beyond the ends of the hems 992 and into the cylindrical openings in the corner connector 114c.

In a typical implementation, every corner in container 102 is formed in a similar manner as the other corners.

Referring again to FIG. 1, the fabric bottom panel 118 of container 102 is coupled to each of the fabric side panels 116a-116d with seams. FIGS. 12A-12D show an implementation of steps to create seams 1212 to join the fabric bottom panel 118 to the fabric side panels (e.g., 116b).

FIG. 12A shows a cross-sectional side view of a side edged of the bottom panel 118 and one of the fabric side panels 116b side-by-side. The ends of these panels 116b, 118 are aligned with one another.

A first stich 1214 is placed through the two panels 116b, 118, as shown in FIG. 12A. In a typical implementation, the first stitch 1088 extends lengthwise (e.g., in and/or out of the page in FIG. 12A) across an entirety of the two panels 116b, 118 from one end thereof to the other end thereof. This attaches the two panels to one another. In the illustrated implementation, the first stich 1214 is placed close to (e.g., less than ¾ inch from) the aligned ends of the two panels 116b, 118. The first stitch 1214, according to the illustrated example, is formed with a needle 1287 and thread 1289.

The first stitch 1214 effectively defines a distal portion 1279 of the adjacent fabric panels that extend past the first stitch 1214. Next, referring to FIG. 12B, a first 180 degree bend (at 1278) is formed in the bottom panel 118 on the opposite side of the first stitch 1214 from the distal portion 1279 of the bottom panel 118. Similarly, an opposite 90 degree bend (at 1280) is made in the side panel 116b on the opposite side of the first stitch 1214 from the distal portion 1279 of the side panel 116b.

Next, still referring to FIG. 12B, a second stitch 1216 is formed to extend through a folded back portion of the bottom panel 118, as well as through the distal portion 1279 of both the panels 116b, 118. In a typical implementation, the second stitch 1216 extends lengthwise (e.g., in and/or out of the page in FIG. 12B) across an entirety of the two fabric panels 116b, 118 from one end thereof to the other end thereof. The second stitch 1216, according to the illustrated example, is formed with the needle 1287 and thread 1289.

The seam 1212 can be formed in a variety of ways—with a greater number of bends and/or stiches, and/or with a different configuration of bends and/or stiches. In a typical implementation, every side panel is joined to a corresponding one of the sides of the bottom panel with a seam (e.g., 1212) and every seam may be formed and configured in the same way as the other seams.

Figure 2:
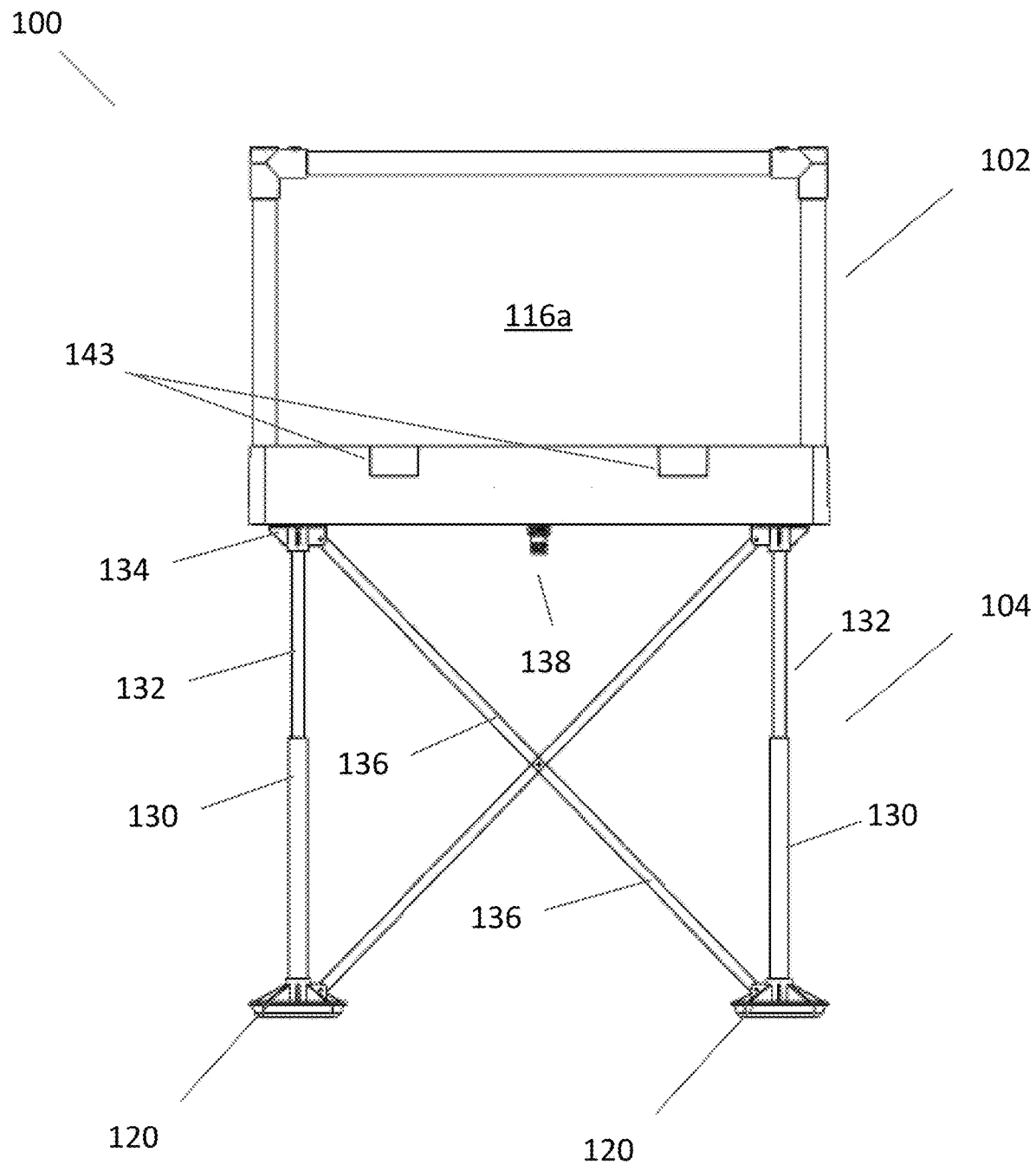
FIG. 2 is a front view of the elevated garden planter of FIG. 1.
Figure 3:
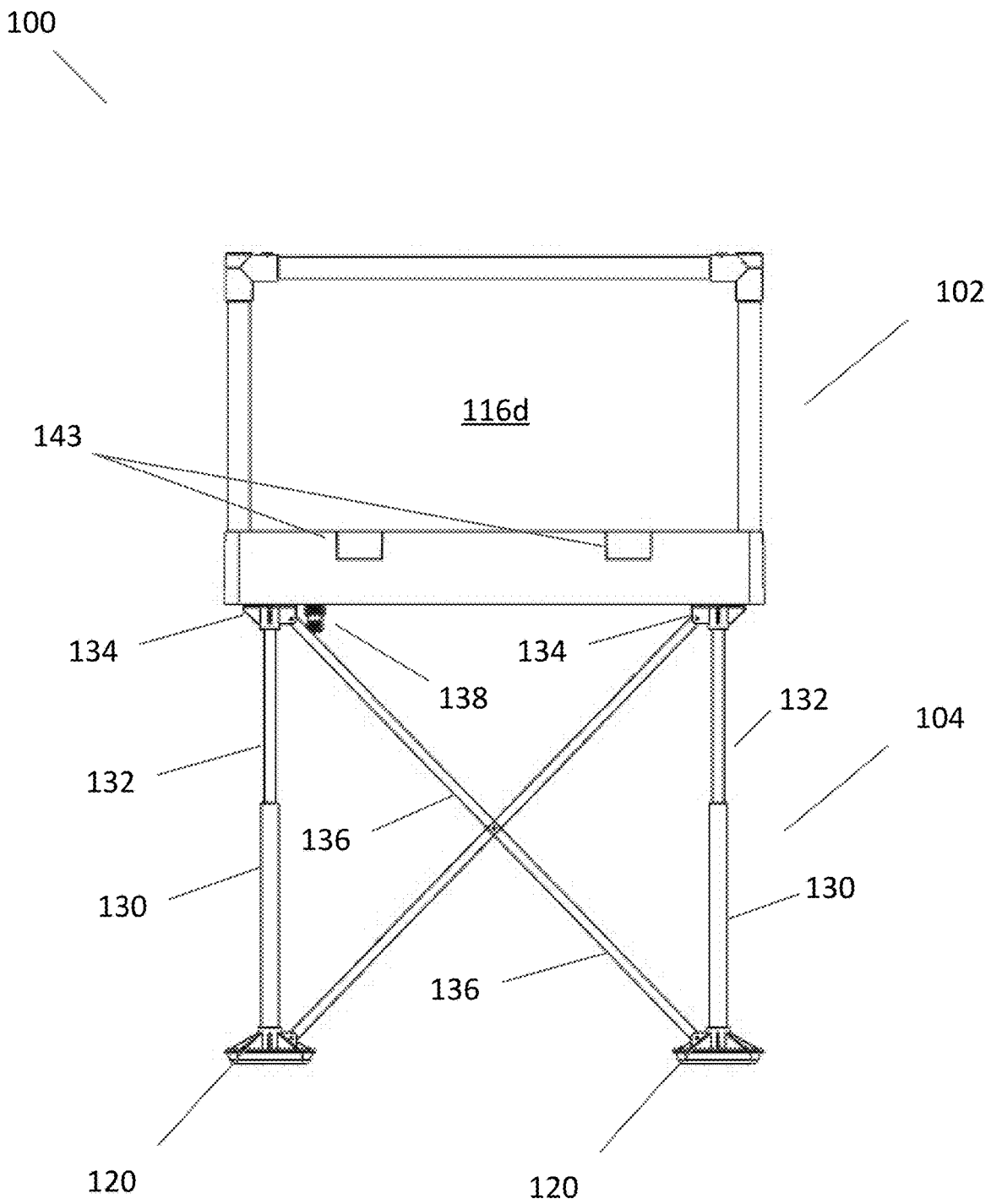
FIG. 3 is a side view of the elevated garden planter of FIG. 1.
Figure 4:
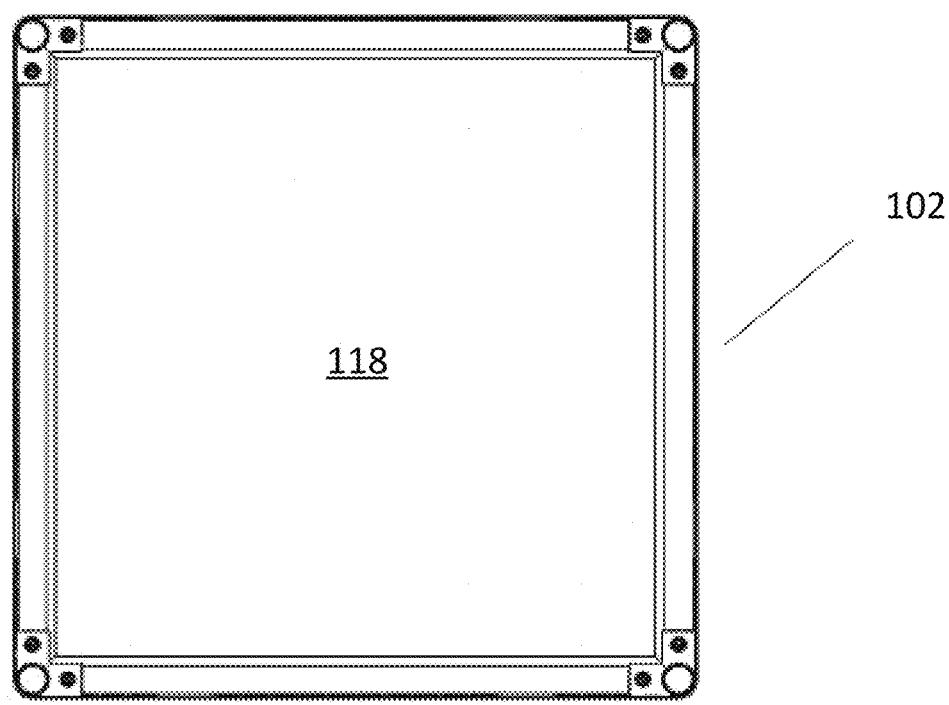
FIG. 4 is a top view of the elevated garden planter of FIG. 1.
Figure 5:
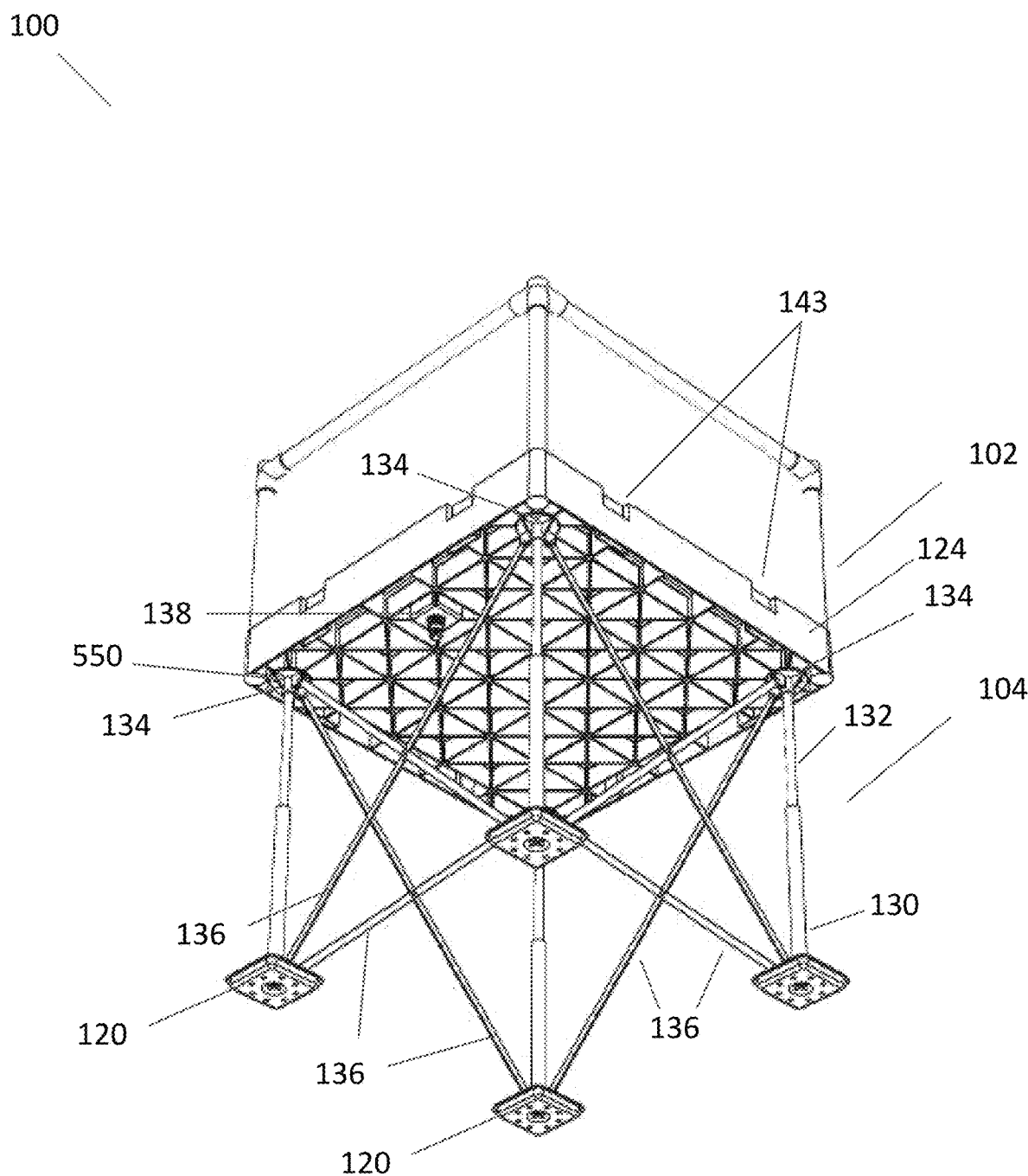
FIG. 5 is a bottom perspective view of the elevated garden planter of FIG. 1.

Referring again to FIG. 1 (and to FIGS. 2, 3, and 5), as mentioned above, the support structure 104, which sits below and supports the container 102 (via its rigid vertical tubes 112a-112d), includes feet 120, a scaffold assembly 122 sitting atop the feet 120, and a support platform 124 sitting atop the scaffold assembly 122.

Figure 8:
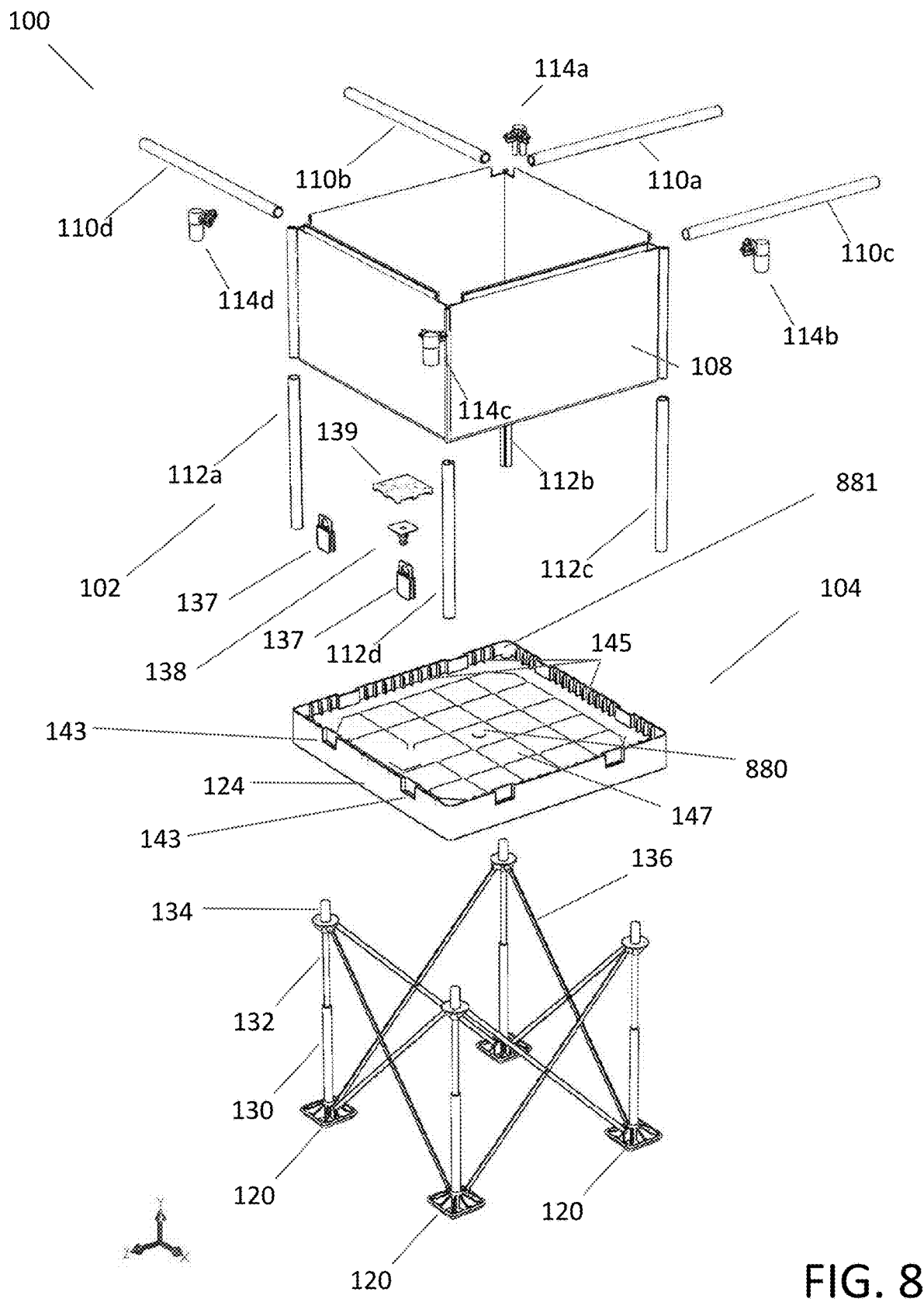
FIG. 8 is an exploded view of the elevated garden planter of FIG. 1.

The support platform 124 forms a tray with an upper surface that may have flat portions to support the fabric bottom panel of the container 102 and side surfaces that together with the upper surface forms a tray-like structure to contain the fabric bottom panel and the bottom portion of the fabric side panels. A recessed grid of interconnected channels is molded into the top surface of the support platform. This detail provides a means for the collection of irrigation runoff that has seeped through the sidewalls and bottom of the container. The bottom of the channel is pitched slightly downward so all collected runoff moves toward a single drain point. There is a single drain (at 138) that allows fluid (e.g., water that seeps out of the fabric bottom and/or side panels) to escape the support platform and be routed (e.g., by a hose or tube, not shown in the figures) to a central drain location (e.g., a collection vessel or the earth). The exploded view of FIG. 8 shows parts of an exemplary drain assembly, where 139 is a drain cover that blends in with other squares that form the drainage grid, 138 is the drain (that would be installed by the consumer typically). Note that the complete drain assembly in a typical implementation might include a rubber seal, (possibly a washer) and nut which are not shown. The drain assembly can vary of course and can include, for example, virtually any kind of drain plug (e.g., one with a threaded body that screws into corresponding threads in the openings in the bottom surface of the support platform). The drain plug 138 may include a hand-operated valve or simply be unscrewed to open the drain line. The drain plug may have a distal portion (facing downward in the illustrated figures) configured to frictionally (or otherwise) engage a corresponding drain line (not shown in the figures). The drain line may be a section of hose, pipe or the like configured to carry or direct drained water to a collection spot (e.g., a pail, bucket, container, the earth, etc.).

A molded in recess on the top and in the center of the platform provides a space to insert a target style level bubble. The integrated bubble allows for a quick and easy check that the platform assembly is level prior to adding the container and soil.

A pattern of ribs (see, e.g., FIG. 6) are formed in a lower surface of the support platform 124. These ribs enhance the structural integrity and support strength provided by the support platform 124. The specific design of ribs and rib pattern can vary. Additionally, in various implementations, other means may be provided with or instead of the ribs to facilitate the support role of the support platform 124.

The scaffold assembly includes a guide tube 130, a leg tube 132, top caps 134, and cross-braces 136. The guide tubes 130 mate with the feet 120. The leg tube 132 sits partially inside the guide tube 130. The top caps 134 are mounted to a bottom surface of the support platform 124. Each leg tube 132 connects to the top cap 134 that is directly above a corresponding one of the feet 120. Two cross-braces extend perpendicularly upward and angled relative to the corresponding guide tube and leg tube, from each foot and terminate at a different one of the top caps 134. There are a variety of possible ways to arrange the support structure 104. These figures show one such arrangement.

What follows is a detailed description of exemplary implementations of an elevated garden planter that builds on the foregoing description and is based on the implementations represented in the figures.

Height

The height dimension, in some implementations, may be constrained by an "ergonomic" or comfortable maximum height for an average person to access a work surface without bending or stooping. This height is approximately 3' or 36". This dimension can be more or less (e.g., +/−6 inches, +/−12 inches, etc.) however 36" is the value selected for this embodiment.

Length

The length dimension, in some implementations, is constrained by an "ergonomic" or comfortable maximum reach for the average person. This distance is approximately 2' or 24". This dimension can be more or less (e.g., +/−6 inches, +/−12 inches, etc.) however 24" is the value selected for this embodiment.

Width

The width dimension, in some implementations, is also constrained by the same comfortable maximum reach for the average person as the length dimension which is 2' or 24". This dimension can be more or less (e.g., +/−6 inches, +/−12 inches, etc.) however 24" is the value selected for this embodiment. The resulting symmetry means that the outward hydrostatic soil forces cancel each other out and deformation of the sides of the container outward are equal and uniform. This avoids the common problem of outward bowing of the long sides of a more rectangular plan form.

Depth

A depth for the bed, in an exemplary implementation, was selected that would allow for the widest variety and types of plants and vegetables to be grown. This includes deep rooted plants like carrots and parsnips. Research and expert opinion has shown that a soil depth of 1' or 12" is optimal. A benefit of a deep bed is that it holds moisture longer than a shallower one and requires less watering. A deep bed has the additional benefit of having a lower center of mass which makes it more stable and resistant to tipping. The bed depth dimension can be more or less (e.g., +/−6 inches, etc.) however 12" is the value selected for this embodiment.

Ideal Product Dimensions

The finished overall product dimensions therefore are 2' wide by 2' deep by 3' tall with a container for the soil that can accommodate a soil depth of approximately 1' deep. A 2'×2' plan means the garden can be accessed ergonomically from all sides. The 2'×2' plan can be configured to accommodate a wide variety of layouts and living spaces.

The Fabric and Frame Container

The container is a structure used to hold the soil. (See, e.g., FIG. 7). The container is comprised of two parts. The first part is an external tubular frame, and the second part is a fabric box that is connected to and suspended from and within the tubular frame. A means to attach the fabric box to the frame is also part of the container. A container made this way is collapsible and advantageously packs very flat and compact for efficient shipping and packaging.

Fabric Box

The fabric box is a five sided open top box comprised of four symmetrical side panels and one base panel. (See, e.g., FIG. 7 and FIG. 13). The side panels are prepared with a top edge hem prior to assembly. This top edge hem and the ones that form during final assembly are utilized as a means to attach the fabric box to its surrounding tubular frame. In this way the fabric box will retain its box-like shape once filled with soil.

The material preferred for this application is a fabric categorized as a geotextile. A geotextile is a tough, woven or nonwoven, polymer based fabric that is used commercially in both landscape filtration and drainage applications and grow pots to hold soil for growing plants. Geotextiles are durable, long lasting, ecofriendly, and breathable. The permeability of the material allows for the exchange of both air and water. This characteristic is advantageous in that it promotes plant root health and plant productivity, helps manage soil moisture, and provides natural drainage and filtration through the bottom and sides where irrigation runoff can be collected for reuse. Geotextiles range in thickness and material, mechanical characteristics, and color. Some geotextiles are made of 100% recycled material. The material used in an exemplary embodiment is approximately 0.080" thick (+/−0.040", for example) and is a light tan color. A variety of geotextile materials, thicknesses and colors may be used.

Alternate Fabric Box Materials

The panels that constitute the box as described thus far can also be made of molded plastic (instead of fabric). The side and bottom panels can be molded such that they can interlock with the frame using the same hem and slit method of connection described above and/or next. These molded panels can be perforated and serve to both breathe and retain the soil. The panels can also be made of metal and treated and connected in a similar way.

Fabric Box Hem and Slit Assembly

The fabric box side panels are die cut and stitched together in such a way that the top edges and the vertical corner seams each have a pronounced hem. This hem is made by folding and stitching the material onto itself. The tubular frame components have a slit or slit that is molded or cut into the full length of each tube such that the fabric hem can be inserted from one end and travel along the length of the tube. In this way the fabric hem being wider than the width of the slit is trapped inside the tube and cannot be pulled out through the slit.

To assemble the box and frame, the tubes that form the rim of the box, called rim tubes, are slid onto each sidewall top edge hem. The rim tubes are joined by plastic corner connectors to form a square. Eight screws are used to secure the intersection of each rim tube with each corner connector. Next the four vertically oriented tubes called corner post tubes similarly slide onto the vertical corner hems from the bottom until they intersect the corner connectors. In this way, the fabric box with hems at the top edge and at the corners is held fast to the frame after the frame is assembled onto the fabric box.

Fabric Box Side Panel

The side panel is an accurately die-cut piece of fabric. (See, e.g., FIG. 13) The side panel has areas along all 4 sides that extend outward for later use as hems and seams. This leaves rectangular notch-outs in the upper corners and triangular truncations in the lower corners. There is minimal waste in the finished die-cut sheet.

Fabric Box Side Panel Top Edge Hem

The top edge hem provides vertical support to the top edge of the fabric sidewall. The sidewall hangs from the hem which is trapped in the supporting tubular frame. This hem is formed in two steps. (See, e.g., FIG. 9A-9D). The first step is to fold the fabric edge down by 1.50". This dimension can be more or less (e.g., +/−0.5"). The next step is to place a stitch along the length one half the width of the fold or in this example 0.75" down. This relative location can vary, too (e.g., +/−0.25"). This puts the stitch in the middle of the fold (or close to the middle of the fold) and in line with (or close to in line with) the lower edge of the corner notches of the side panel. These notches align with the underside of the corner connectors. The remaining material, which is 0.75" in this example, is folded back up and a stitched is placed in the middle along the length of the fold to keep the material folded up. The final hem leaves a fold at the first stitch that defines the location of the point the hem will lock against the inside of the slit of the tubular frame and restrain the side panel vertically.

Fabric Box Side Panel Vertical Corner Hem

Once all the top hems have been made the 4 side panels can be joined together at the vertical corners to form the 4 sides of the fabric box. All panels should be connected inside out. Align two panels inside face to inside face. A stitch 0.75" from the edge is made along the entire length of the vertical corner. This dimension works well but can be more or less (e.g., +/−0.25"). The dimension selected should be consistent for all corners. Repeat until all 4 panels have been joined. Next, the process includes turning the assembly right side out. A second stitch is placed at the point where the folded material in the corners goes from 4 plies to 2 plies. This second stitch defines the location where the hem will lock against the inside of the slit of the tubular corner post tubes to restrain the side panel laterally.

Fabric Box Bottom Panel

The bottom panel is made from the same geotextile as the side panels. The bottom panel is an accurately cut square with four equally truncated corners. The truncations described here are incorporated to prevent excessive material buildup when stitching the seams in the corners. To assemble the bottom panel, the outside of one of the side panels and the bottom panel are aligned face to face and edge to edge. A stitch is made 0.75" from the edge along the full length of the edge. This dimension works well but can be more or less (e.g., +/−0.25"). The stitch should start and end at the middle of the truncated corner of the bottom panel. This stitch defines the corner of the fabric box. Next, the process includes repeating the same stitch for all other side panels. Next, the process includes turning the assembly inside out and folding the standing seam onto the bottom panel. Next, the process includes stitching this seam down in the middle all around to complete the fabric box assembly. The previously truncated corners now appear as mitered joints inside the fabric box. This last stitch anchors the fold and relieves outward hydrostatic pressure on the first stitch.

There is almost no limitation to the type and variety of materials that can be used to manufacture a suitable fabric box. Different materials and thicknesses can be used on the different panels to meet future design requirements. For example, the bottom panel may be a more porous material to expedite drainage. Future side panels, for example, may have a reflective surface on the outside to help keep the grow beds cool in hot climates.

Fabric Box Frame

The frame that supports and is integrated with the fabric box is composed of tubular components and connectors and held together with fasteners. (See, e.g., FIG. 1 and FIG. 8). There are four horizontally oriented rim tubes that are joined by corner connectors to form a square. Eight screws are used to secure the intersection of each rim tube with each corner connector. Four corner post tubes are vertically inserted into the corner connectors to finish the assembly of the frame. In this way a rectilinear free standing box shaped frame is made.

Frame Tubes with Slits

The structure that forms the frame consists of four rim tubes and four corner post tubes. Both the rim tubes and corner post tubes are made from the same, approximately 1" diameter plastic tubes with a wall thickness of approximately 0.080". Dimensions and wall thicknesses can be more or less (e.g., +/−10%) and the tubes can be any useful profile (e.g., circular, oval, etc.). The tubes can also be made of metal. Each tube has a full length slit. The width of the rim tube slit is approximately 0.100" and the width of the corner tube slit is approximately 0.125". These slit width dimensions can be more or less (e.g., +/−10%) to suit ease of assembly depending on the thickness of the material used to construct the fabric box. The sharp corners at the end of each slit can be removed to make assembly of the fabric box into the tube slits easier. Once assembled the rim tubes are trapped inside the corner connectors restraining the rim tube slit so that it cannot open up thereby maintaining a strong connection with the fabric boxes side panel top hem. The corner post tube slits are likewise restrained at the corner connector and inside the support platform corner recesses and likewise cannot open up thereby maintaining a strong connection with the fabric boxes side panels vertical corner hem.

Frame Corner Connectors

The corner connectors are molded one-piece plastic parts that accept the frame rim tubes and corner post tubes to form a rectilinear box shape. These can also be made out of metal. The recesses in the corner connectors that accept the rim tubes can have a guide rib (see, e.g., 1420*a* in FIGS. 14A and 14B) molded in that matches the width of the slit. In this way the slit in the rim tube must be oriented in a specific way to be inserted into the corner connector. This allows for the orientation of the fabric joint in the corner to be controlled. In some implementations, the slit of the rim tubes may be set at 45 degrees off the horizontal pointing downward toward the interior of the box. This angle matches the natural slit orientation in the corner post tubes and thereby provides a relaxed condition for the fabric to span the corner without distortion. This angle can be more or less (e.g., +/−5 degrees or +/−10 degrees) and the guide rib may be excluded or have a different appearance. Screws secure the rim tubes to the corner connectors and ensure the rim tubes have been fully inserted. There are no screws required for the corner post tubes as the entire fabric box and frame assembly will apply a downward force on this connection when filled with soil. A tubular recess is provided on the top of the corner connector for possible future accessories such as a hoop system to cover and protect the garden.

Advantages of Hem and Slit Style Frame and Fabric Box

A container formed with hem and slits distributes the hydrostatic forces presented by the outward soil pressure evenly throughout the structure. Aesthetically and mechanically, a container formed with hems and slits provides the most controlled geometry of the containers formed from fabric and frames. This rigidity of the top edge of the box provides a space or headroom between the top of the frame and the top of the soil such that the planting area can be irrigated without having the water inadvertently spill over the top edge. A container formed with hem and slits exposes the supporting framework all around and provides an easy to clean surface with soft and rounded contact point for the user. Although the frame components can be made to a high dimensional tolerance, the flexibility and stretch of the fabric ensure consistent ease of assembly.

Fabric and Frame Container Integrates with the Support Structure Platform

The four corner post tubes extend down below the level of the bottom panel of the fabric box approximately 2". (See, e.g., FIG. 8). This dimension can be more or less (e.g., +/−1" or +/−1.5"). The fabric and frame container assembly is positioned over the support structure platform and the corner post tubes are inserted into a correspondingly equal 2" deep cylindrical recesses (or whatever depth is available in the recess) in each corner such that the bottom of the fabric box becomes contiguous with the top of the platform. In this way the fabric and frame container assembly is integrated structurally to the support structure platform. The connection of the corner post tubes into the support structure platform corner recesses stabilizes the corner post tubes vertically, locates the corner post tubes perfectly square to one another, and holds the corner post tubes at a fixed distance from one another providing an accurate and repeatable form for the fabric bag to be suspended from.

Support Structure

The support structure is the portion of the planter responsible for stably supporting the fabric and frame container and soil off the ground. The support structure is comprised of three parts. (See, e.g., FIG. 8). Four wide feet, a four-legged quick-erecting scaffold assembly, and a heavy duty platform. The platform transfers the container and soil loads to each of the four legs of the scaffolding which in turn transfer the loads through the feet to the ground. The feet, scaffold, and platform are detailed below.

Support Structure Foot

The foot design in this example is driven by maximum surface area and stability. (See, e.g., FIG. 6). In plan view, the outer rim of the feet do not extend beyond the outer boundary of the platform. In this way adjoining units can be positioned next to one other without interference. This maximum outward position ensures the widest footprint and the maximum resistance to lateral tipping forces. The foot is molded out of plastic although it can be made of metal. The foot dimensions selected for this embodiment is 4"×4". This dimension can be more or less (e.g., +/−1") but the size affects the center to center dimension of the legs in the scaffold as the outer edge of the foot maintains alignment with the outer edge of the platform. The square shape provides the maximum surface area for a given width dimension, minimizing the load per square inch on the part and maximizing the load distribution to the supporting surface. The four feet combined provide over one square foot of supporting surface area per assembly.

Structurally the internal surface of the foot that bears the weight of the leg is located on top of a pattern of vertically oriented ribs (see, e.g., FIGS. 1-3) such that the weight being transferred through the leg can be distributed outward through the ribs instead of downward through a single layer of material. The foot is self-orienting within the assembly because the cross braces that join them are connected via two sets of gussets. These gussets are molded at 90 degrees to each other on the foot. Because of this, the flat sides of all four feet remain parallel to each other and to the platform in both the open and closed positions. A generous fillet around the underside of the perimeter of the foot acts as a ski to make it easy to move the full assembly laterally for positioning and leveling. (See, e.g., FIG. 5). As a molded part, the nominal wall thickness selected is 0.125" however this dimension can be more or less (e.g., +/−0.1") with the ribs being more or less thick relative to the nominal wall thickness of the overall part.

In some implementations, the foot is a separate component. A component similar to the top cap could be used at the bottom and the foot could be fitted into it and secured by a screw just like the top cap is attached to the underside of the platform with a screw. This way the cross braces could be preassembled. An advantage of a removable foot would be that the scaffold would fold down to a much smaller dimension for shipping and storage.

Support Structure Scaffold

The quick-erecting scaffold is a preassembled series of components that allow the user to set up the scaffolding by expanding the mechanism and standing it on the ground. The scaffolding is comprised of four leg assemblies connected to each other by articulating cross braces. (See, e.g., FIGS. 1-3 and 5). An individual leg assembly is comprised of a molded foot as previously described, a guide tube, a leg tube, and a top cap. The guide tube is a tube that is press fit inside the foot. It is preferable that it is made of plastic, but it can be made equally out of metal. Its purpose is to guide the leg tube down to the foot when the assembly is expanded into the open position. As the assembly is closed or collapsed the guide tube is long enough to prevent the leg tube from coming out, thereby keeping the assembly together and ready for quick redeployment. The guide tube is plastic and is approximately 0.75 "in diameter with an approximately 0.50" diameter hole in the center to accommodate the leg tube. The current design utilizes a guide tube that is approximately 8" long. The leg tube is the structural element that transfers all of the soil, container, and platform loads to the ground. It is made of steel but could be made out of other metals or fiber reinforced plastics like fiberglass. The leg tube is approximately 21.625" long and has an outside diameter of approximately 0.50". The wall thickness is approximately 0.40". All dimensions can be more or less (e.g., +/−10%) but the dimensions described work well and yield a support structure platform height that positions the top of the fabric and frame container at 36" off the ground. The top cap is connected to the top of the leg tube via a screw. The top cap also has standing ribs that provide locations to attach the cross braces. The top cap is designed to locate and fit into matching recesses or bosses on the underside of the support platform. A through hole aligns with a matching boss on the underside of the support platform so that they may be connected with a screw during assembly. The top cap is a molded part with a nominal wall thickness of 0.125". This dimension can be more or less (e.g., +/−10%) and the part can be formed out of metal.

The four leg assemblies are connected with rivets to cross braces from one foot to a neighboring corner top cap through the gussets molded on each part. Four sets of cross braces cross that are centrally pivoted connect the four top caps to the four feet all around. The cross brace is made of steel flat stock but can be made of plastic. The cross brace is approximately 0.50" wide by 0.080" thick and approximately 27" long. The width and thickness can be more or less (e.g., +/−10%) but these dimensions work well. The length of the cross braces is precisely determined such that when the quick-erecting scaffold is fully deployed the leg tube is in full contact with the foot.

Scaffold Operation

The top cap is secured to the leg tube so that they move together and in plane with the foot. The guide tube fits snugly inside the foot such that they move together. In the assembly the leg tube fits and slides freely inside the guide tube such that as the assembly changes from the retracted or closed state to its expanded or ready to use state the leg tube telescopes down into the guide tube until it comes to rest at the bottom of the guide tube and onto the foot. In this way the quick-erecting scaffold opens repeatedly to a predetermined dimension. The center to center dimension of the top caps matches the receiving holes on the underside of the support platform for easy assembly. The mechanism can be collapsed with ease for storage or transport. While being retracted or closed the bottom of the leg tube moves away from the foot but remains within the guide tube. In this way the leg tube is trapped and can be easily redeployed quickly.

Alternate Support Structure Scaffold

The scaffold can be assembled without the need for a guide tube. Just as in the proposed assembly, the top caps, cross braces, and feet are preassembled. As the user expands the assembly the 4 individual leg tubes are fitted one at a time into both the foot and the top cap. In this configuration it is helpful to connect the leg tube to both the top cap and the foot with screws to keep the assembly together. It is also possible to connect the leg tubes to the top hat, so the user only has to position the leg tubes into each foot during deployment.

Support Structure Platform

The support structure platform is responsible for supporting the bed of soil carried by the fabric and frame container, transferring those loads to the scaffolding, collecting irrigation runoff, and providing a means to connect adjoining units together. The support structure platform is comprised of a single molded part and resembles a tabletop. It is approximately 24"×24" in plan and is approximately 2" thick. It also has a vertical side wall all around that extends above the platform surface approximately 1.25" making the apparent thickness of the finished part 3.25" from the side view. These dimensions may be more or less (e.g., +/−10%). In general, the nominal wall thickness of this and all the other molded parts, except the tubing maybe 0.125", in an exemplary embodiment. The platform is made rigid to minimize deflection through the use of deep horizontal and diagonal ribs that transfer the total wetted soil loads out to the scaffolding. Bosses have been placed at the ribs intersections to provide fastening points for future accessories. The platform has cylindrical recesses in the corners for the container frame corner post tubes that secure and orient the container.

Support Structure Platform Runoff Collection Features

As mentioned earlier a continuous vertical side wall wraps all around the platform and extends above the platform top surface approximately 1.25". The fabric and frame container is designed to sit within the confines of this vertical side wall such that all runoff from irrigation is captured by it. This vertical side wall has two features that are common to all four sides. Each side has two recessed connection points 143 that are approximately 12" on center and located symmetrically 6" off the center of the platform. Each recess can be used in conjunction with a connecting clip to join and align adjacent units. Each recess 143 can be alternately used to attach any foreseeable accessory with a suitably sized clip. There are two recessed connection points per side for a total of eight per platform allowing platforms to be connected on any side. The second feature each side has are a number of inward facing standing ribs 145. These ribs 145 are approximately the same depth as the recessed connection point side walls and serve two purposes. One is that they prevent the container 108 sidewalls from touching the vertical sidewall of platform 124 to ensure that all irrigation runoff is captured. The second purpose is to stiffen the vertical side wall.

The top surface 147 of the platform is designed to capture and channel the runoff from irrigation via an interconnected grid of recessed channels. Runoff filtered through the bottom of the fabric of the container drops into the grid of recessed channels below. The bottom of the channel grid is sloped so as to drive the collected irrigation runoff to the single drain point 138. The drain at that single drain point 138 is centered along one side of the platform for easy access from the side. The single drain point 138 is a recessed cavity in the shape of a cube. A separate assembly for the drain is installed here.

The drain assembly, in a typical implementation, consists of a drain body with a square top flange, a round flange seal, a washer, and a nut. To avoid damage during shipping and to minimize shipping size the end user may install this assembly. Once the drain assembly has been secured, other connections can be made to the protruding drain without loosening the seal of the drain with the platform. Adjoining units drains can be linked together to manage runoff to a single runoff recovery tank for reuse.

Support Structure Scaffold and Platform Connection

The platform has four receiving holes (at 550 in FIG. 5, for example) on the underside that align with the top caps 134 of the scaffold mechanism. With the scaffold fully expanded the platform 124 can be dropped in place. The top caps 134 of the scaffold orient and fit within the receiving holes on the underside of the platform. Once set in place they can be connected permanently using a single screw in each top cap that connects to a boss on the underside of the platform. Assembly of the entire support structure is quick and, in a typical implementation, requires only a screwdriver.

Support Structure Platform Leveling

Once the support structure has been assembled and positioned in a desired location it can easily be leveled with the aid of a target style level bubble 880 which has been permanently installed during production in a small recess in the center of the platform. The unit and the ground should be made level for optimal collection of irrigation runoff and for ease of connection with adjacent units.

Support Structure Side Connection Clip

A U-shaped clip 137 is provided that allows adjacent support structure platforms to be connected to one another. Recesses on all four sides of the platform provide two connection points per side. Units may either be connected side by side and in line with each other or offset half the platform width to form a variety of ergonomically accessible plan forms. At least two clips would accompany each unit.

Alternative Uses of the Container and Support Structure

The support structure 124 can be molded with or without various features. The simplest version would be a flat platform supported by scaffolding and feet. An expandable/modular elevated surface that can be clipped together could support many related agricultural applications such as a planting table for a greenhouse. The support structure scaffolding, for instance, can surround a fish tank while having a hydroponic system on the platform to support a complete aquaponics system for growing plants and fish. Alternatively, the platform could easily support a hydroponic system for growing plants in water.

Alternative Heights for the Support Structure

For growing tall vine-like plants it may be desirable to have a shorter unit. Changes can be made exclusively to the leg tube and cross braces to reduce overall height. The support structure scaffold cannot be made to be quick-erecting and must have the leg tubes installed during set up. Even with a shorter assembly the drain is still accessible for runoff collection.

Ground Placement of Fabric and Frame Container

The fabric and frame container can be used directly on the ground. In this case the end user must create four holes to receive the corner post tubes that extend below the plane of the bottom of the fabric box or cut down the length of the corner post tubes. Alternatively, an accessory that provides shorter corner post tubes plus ground stakes that are molded to fit snugly inside the corner post tubes could be made available.

Alternative Containers

The support structure platform itself is versatile and can be used to support any container to grow food at an ergonomically comfortable height. Alternative containers include rigid plastic tubs, wooden boxes, Frameless free standing fabric grow bags, partially framed grow bags that have four vertical corner pockets that are guided by four corner post tubes or fully framed grow bags. Larger containers can be used either in conjunction with a matching set of connected support structures.

Fabric container consisting of two rectangular panels that have both long seams hemmed on both sides. The two panels are positioned flat on top of each other with one of the panels being turned 90 degrees to form a flat cross. The areas outside the overlap can be folded up until their hems meet and then they can be joined using a tubular element with a corresponding slit such that a corner is formed. Four tubes in total are needed to form the finished container. This container can be used as a stand-alone item or an additional molded part can be added to formalize the rim, help maintain the overall form, provide headroom between the soil and rim above the soil for watering, provide a means to attach the corner tubes to stabilize them, and provide a means to attach accessories.

Accessory: Square Foot Gardening Grid

A popular method of gardening involves the use of a 1' square grid as a planting guide. The grid is placed over the growing area and the seeds or plants are set inside. The system ensures that the plants have adequate space to grow while optimizing planting density. In this application two nylon straps of approximately two 0.75" wide forming a cross is stitched in the center. The straps are each 2' long. At the end of each strap is attached a clip. The cross is then clipped onto the finished fabric and frame container at the centers of the rim tubes. The cross divides the growing space into four equal 1 foot square spaces. The grid not only provides guidance for efficient use of the planting space, but it mechanically holds the rim tubes together and keeps them straight. The accessory can be left on for the duration of the growing season or removed after planting.

Moisture Control

Fabric that forms the container for the soil can be imprinted with a semi permeable or impermeable layer for the purposes of moisture control by limiting evaporation of moisture from the soil through the fabric. The imprinted layer may be on the inside or the outside or both. In some implementations, the pattern formed by the imprinted layer defines holes in the imprinted layer to expose some of the underlying fabric surface while covering other areas of the underlying fabric surface. The shape, size, and distribution of the imprinted layer pattern controls the amount of exposed fabric surface area and thereby influences the amount of moisture that is allowed to escape, through the fabric, to the outside air. In addition to moisture control, the added layer may provide a graphic opportunity to add aesthetic interest through the use of color, pattern, logos and/or other artwork.

Alternative Implementation

Figure 17:
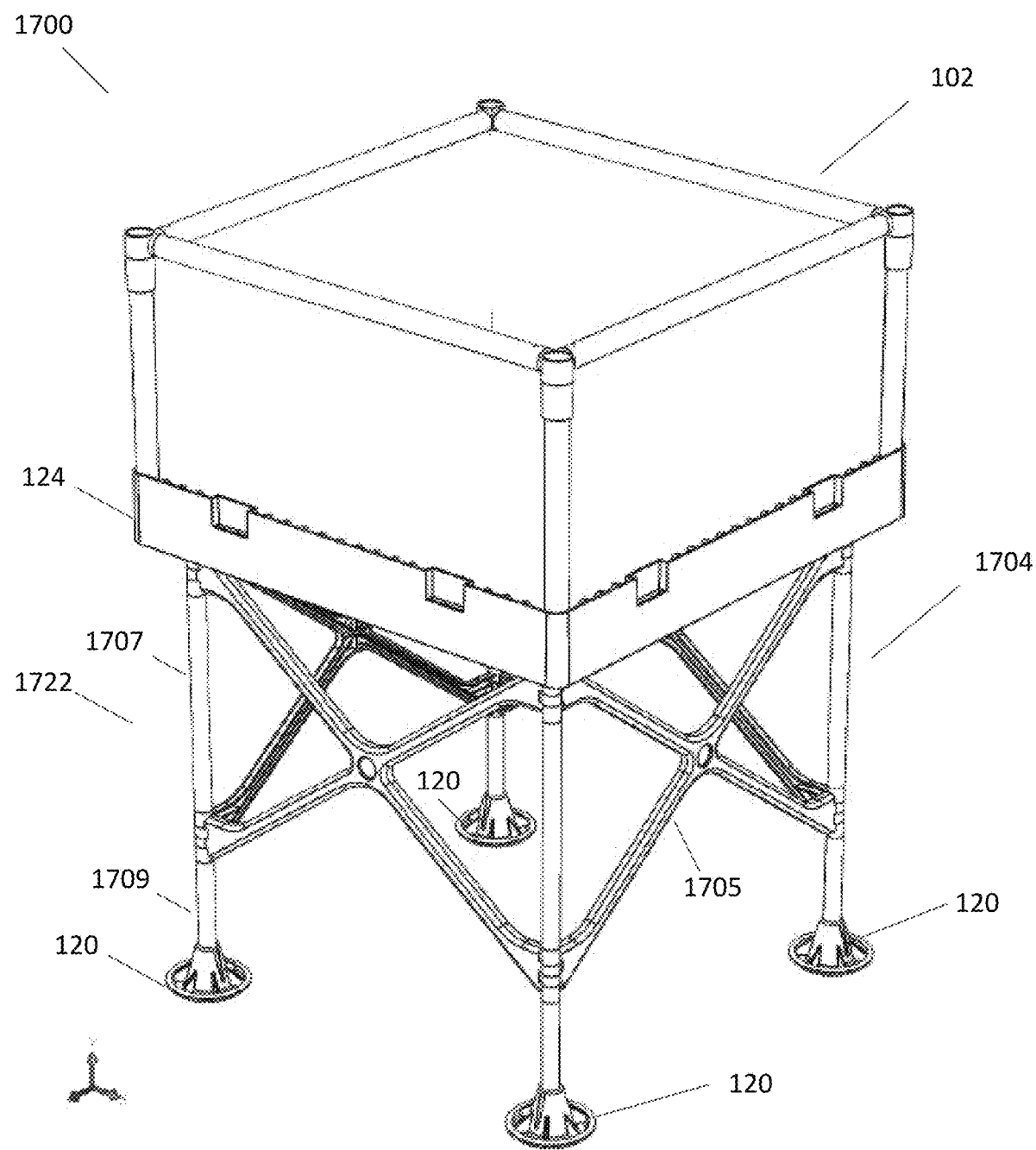
FIG. 17 is a top perspective view of an alternative implementation of an elevated garden planter.

FIG. 17 shows an alternative implementation of an elevated garden planter 1700.

Figure 18:
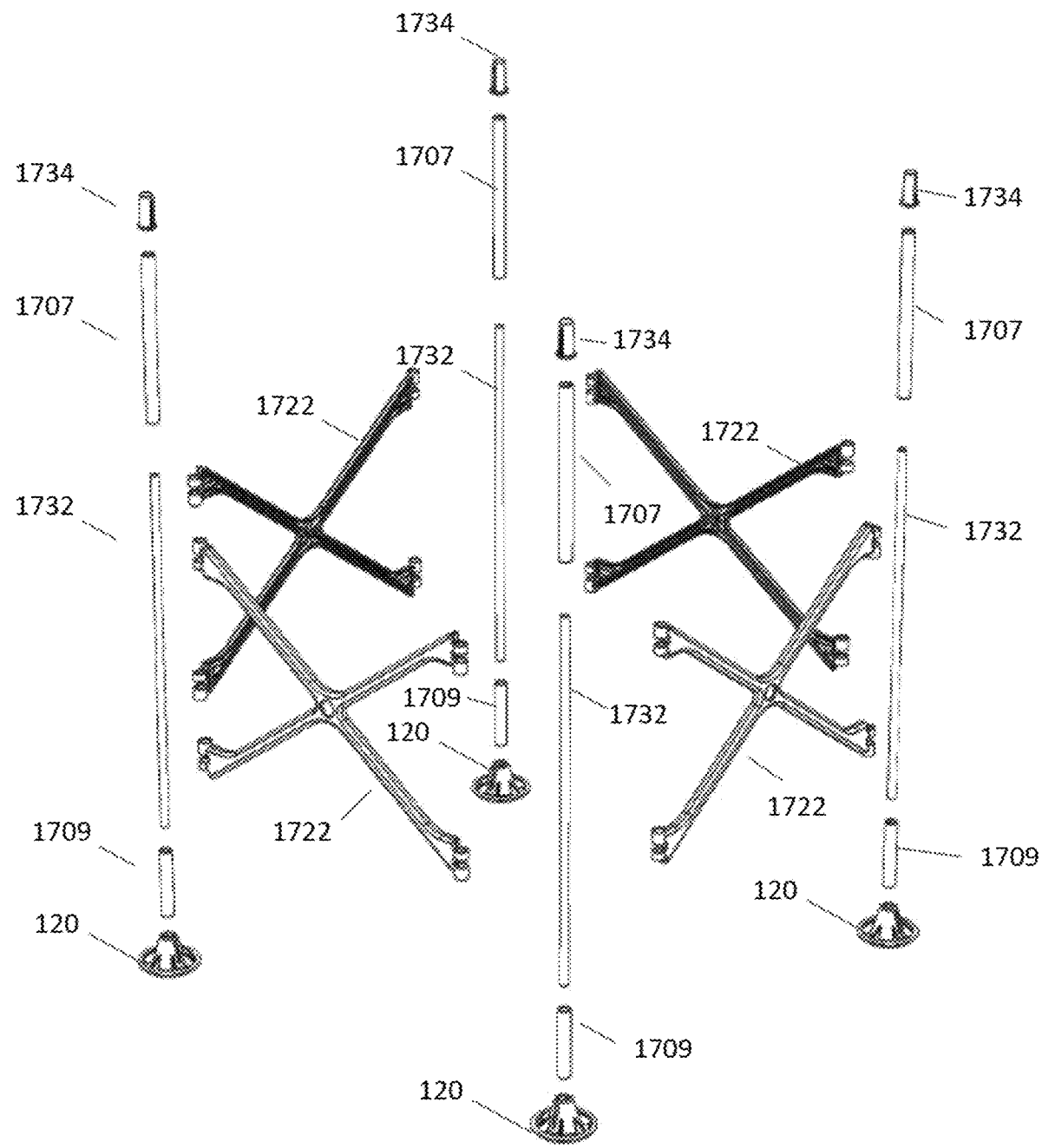
FIG. 18 is an exploded view of the support structure in FIG. 17.

The elevated garden planter 1700 includes a container, which in the illustrated implementation 102 is the same as container 102, and a support structure 1704 for container 102. The support structure 1704 has feet 120, a scaffold assembly 1722 sitting atop the feet 120, and a support platform 124 sitting atop the scaffold assembly 1722. FIG. 18 shows an exploded view of the support structure 1704 of FIG. 17.

The support structure 1704 includes four cross braces 1705. Each cross brace 1705, in the illustrated implementation is a rigid, x-shaped frame with a knuckle at each corner of the x-shaped frame. Each knuckle has a pair of vertically-aligned tubes. The vertically-aligned tubes in each knuckle is vertically-aligned with the vertically-aligned tubes in the knuckle below it or above it, as the case may be. The vertically-aligned tubes have vertical cylindrical openings that are sized to receive (and to allow to pass through) a leg tube 1732. The leg tubes 1732 are structural load bearing elements that can be made of steel but could be made out of other metals or fiber reinforced plastics like fiberglass. In assembly (e.g., as shown in FIG. 17), each leg tube 1732 extends through the vertically-aligned tubes of an upper and a lower knuckle of two adjacent and orthogonal cross braces 1705.

There is a vertical separation between the vertically-aligned tubes in each knuckle. This vertical separation has the same dimension (in the vertical direction) as either one of the vertical-aligned tubes. This enables the knuckle of one cross brace 1705 to be physically configured relative to another one of the cross braces 1705 as shown in FIG. 17 with one of the vertically aligned tubes on each one of the cross braces nesting between two of the vertically aligned tubes on its adjacent, orthogonal cross brace.

The support structure 1704 also has upper spacer tubes 1707 and lower spacer tubes 1709. In assembly (e.g., as shown in FIG. 17), each leg tube 1732 extends through one of the upper spacer tubes 1707 and an aligned one of the lower spacer tubes 1709. Moreover, in assembly, each upper spacer tube 1732 sits between (and physically contacts) the upper and lower knuckles 1707, 1709 through which its leg tube 1732 passes. Moreover, in assembly, each lower spacer tube 1709 sits between (and physically contacts) the lower knuckle 1709 and the corresponding foot 120.

The top caps 1734 are mounted to the bottom surface of the support platform. Each leg tube 132 connects to (e.g., by extending into a short cylindrical opening in) a corresponding one of the top caps 1734.

Compact Support Structure

For the purposes of reducing the size of the packaged product into the smallest practical footprint, a variation of the support structure that differs from the previously detailed support structure is described as follows and shown in FIG. 17.

Desirable Package Size

In some instances, desirable package dimensions may be approximately 2' wide×2' long×3' high, so the collapsed package dimensions (in two of the three dimensions) should be kept within a 2'×2' footprint with a very small height (e.g., preferably no more than about 12 inches or 6 inches or 4 inches). The initially described preassembled brace and leg assembly folds out by the end user for connection with the platform and later can be removed and folded up for storage. This preassembled system becomes longer than the diagonal of the 2'×2' footprint in its compressed state and therefore requires a larger shipping box to encompass it. The components of the compact version of the support structure avoids this by fitting within the 2'×2' footprint.

Components of the Compact Support Structure

The compact version of the support structure consists of 4 sets of 6 components that, in an implementation of the FIG. 17 raised garden planter 1700, are assembled by the end user. This embodiment may utilize a press fit assembly between the identified components, requiring no tools for assembly and the various components may be held together via a friction fit only. These components include:

1. Cross brace: The cross brace which is a single "X-shaped" molded part with hollow molded cylinders (or vertically-aligned tubes) at the ends that interlace with an adjoining cross braces to form a hinge like arrangement.
2. Leg tube: A metal leg, acting as a hinge pin, is inserted through the molded cylinders to connect adjoining cross braces.
3. Spacer tube: A spacer tube is placed between the opposing molded cylinders before the metal leg is fully inserted trapping the spacer tube in the assembly. The function of this tube is to eliminate lateral motion of the assembly by maintaining a constant distance between the ends of the cross braces. This in conjunction with the downward pressure from the weight of the soil filled container make the support structure assembly rigid.
4. Top cap: A top cap is pushed onto the metal leg once it has been pushed through the second set of interlaced molded cylinders. The top cap is the interface between the leg and the platform and remains in place by friction fit.
5. Lower spacer tube: A lower spacer tube is fitted over the end of the metal leg by the foot.
6. Foot: A molded foot is then pushed on via friction fit.

Assembly of the Compact Support Structure

To assemble, the four cross braces 1705 are laid flat, side by side. A metal leg (leg tube 1732) is inserted through the first interlacing hinge (pair of knuckles) like cylinders (e.g., vertically aligned tubes) to connect adjoining cross braces 1705. Before passing the leg tube 1732 through the opposite (aligned) set of interlacing hinge like cylinders an upper spacer tube 1707 is positioned between the opposing interlacing hinge like cylinders and the leg tube 1732 is fed through the spacer tube 1707 and then into and through the opposing interlacing hinge like cylinders. Once through, a top cap 1734 is press fit onto the end of the leg tube 1732. Three leg tubes 1732 are used in this manner to connect four cross braces 1705 in the flat position. Once complete, the assembly can be stood up with the top caps 1734 facing down. The outer ends of the outer cross braces 1705 can then be made to come together so that the four cross braces 1705 form a square. The last leg tube 1732 is used to connect these outer ends of the outer cross braces 1705 using the last upper spacer tube 1707 and top cap 1734. Four lower spacer tubes 1709 can be fitted over each of the leg tubes 1732 and four feet can be press fit onto the end of the leg tubes 1732. The assembly can then be inserted to an inverted molded platform and the top caps 1734 can be aligned with and inserted into matching holes on the underside of the molded platform. Once inserted and press fit together the entire support structure can be righted and the container for growing can be added. (See, e.g., FIG. 17)

Friction Fit Assembly does not Require Tools

In some implementations, a top cap component controls the fit between the leg tube and the platform. A mechanical feature of the top cap, in such implementations, allows the leg tube, top cap and top cap receiving hole on the underside of the platform to fit together securely without any movement and without the need for fasteners. The inside wall of the top cap which goes over the leg tube matches the parallel sidewalls of the leg tube by having no draft angle. A slit in the part allows the part to expand and fit over the leg tube during assembly. The absence of draft angle on the inside surface that matches the leg results in large surface area contact between the top cap and the leg tube such that when fully assembled makes it difficult for the components to be separated.

Similarly, the foot component, in some implementations, is designed with no interior draft angle and a slit which allow for ease of assembly plus a secure friction fit when in use. The foot in this instance is round in plan so that no orientation with the assembly is necessary.

Alternate Cross Brace Design

In some implementations, each cross brace can be made of two (or more) molded pieces instead of one. In instance where each cross brace is made from two pieces, the two pieces can be pivotally connected in the middle such that they can be shipped in a collapsed state and opened up during assembly to form the same cross brace shape as shown in the figures and otherwise disclosed herein.

A number of embodiments of the invention have been described. Nevertheless, it will be understood that various modifications may be made without departing from the spirit and scope of the invention.

For example, the size, shape, and configuration of the planter and/or various planter components can vary considerably. A variety of materials can be used to form each component as well. There are a variety of ways in which the fabric portions can be coupled to and supported by the rigid tubes. In an exemplary implementation described herein, each rigid tube has a slit that extends lengthwise along its entirety. However, in some implementations, the slit may not extend along the entire length of the tube but only a substantial portion of the length (e.g., 80%, 90% or more) beginning, for example, at one end of the rigid tube. The support structure design can vary including the specific configuration of tubes and/or braces. Rib and/or other reinforcing structure designs can vary. Techniques and means for attaching various system components (e.g., with screws, rivets, adhesives, etc.) can vary.

In some implementations, the container is 13.5" tall not including the 2" the corner posts extend below. This accounts for 12" soil bed and 1½" headroom for irrigation. The platform tops out at 22½" for a total of 36". These dimensions can, of course, vary.

Moreover. while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations are within the scope of the claims.

What is claimed is:

1. An elevated garden planter comprising:
a container; and
a support structure for the container,
wherein the container comprises:
a frame portion; and
a fabric portion supported by the frame portion,
wherein the frame portion of the container comprises:

a plurality of rigid horizontal tubes;
a plurality of rigid vertical tubes; and
a plurality of corner connectors, wherein each corner connector connects one of the horizontal tubes to a different one of the horizontal tubes and to one of the rigid vertical tubes at an upper corner of the frame,
wherein each rigid tube has a slit that extends lengthwise along the rigid tube;
wherein the fabric portion of the container comprises:
a plurality of fabric side panels; and
a fabric bottom panel,
a hem at an upper edge of each respective one of the fabric side panels, and
a seam attaching each respective one of the fabric side panels to an adjacent one of the fabric side panels;
wherein each respective hem is located inside a corresponding one of the rigid horizontal tubes with an associated one of the fabric side panels extending through the slit of that rigid horizontal tube,
wherein each respective seam is located inside a corresponding one of the rigid vertical tubes with the associated adjacent fabric side panels extending through the slit of that rigid vertical tube,
wherein each of the side panels comprises:
a rectangular main portion with truncated lower corners; and
a top extension portion that extends in an upward direction from the rectangular main portion and is centered along a top edge of the rectangular main portion.

2. The elevated garden planter of claim 1, wherein:
the plurality of rigid horizontal tubes consists of four rigid horizontal tubes,
the plurality of rigid vertical tubes consists to four rigid vertical tubes, and
the plurality of fabric side panels consists of four fabric side panels.

3. The elevated garden planter of claim 2, wherein the four rigid horizontal tubes are connected together to form a rectangular configuration,
wherein each of the four rigid vertical tubes extend in a downward direction, parallel to one another, from each respective corner of the rectangular configuration; and
wherein the four fabric side panels and the fabric bottom panel collectively define an open-topped box for containing soil and plants.

4. The elevated garden planter of claim 1, wherein each of the hems comprises:
a first fold in a downward direction in the corresponding extension portion, wherein fabric that extends distally past the first fold defines a folded down part of the extension portion;
a first lengthwise stich through the folded down part of the extension portion and a non-folded down part of the extension portion;
a second fold in an upward directed in the corresponding extension portion, wherein fabric that extends distally past the second fold defines a folded up part of the extension portion; and
a second lengthwise stitch through the folded up part of the extension portion, the folded down part of the extension portion, and the non-folded down part of the extension portion.

5. The elevated garden planter of claim 4, wherein each of the hems at the upper edge of one of the side panels is inside a corresponding one of the rigid horizontal tubes; and
wherein each side panel extends out from the corresponding rigid horizontal tube through the lengthwise slit in the corresponding horizontal tube.

6. The elevated garden planter of claim 1, wherein each of the seams that attaches one of the fabric side panels to an adjacent one of the fabric side panels comprises:
a first stitch that extends lengthwise through both the adjacent side panels along aligned edges of the adjacent fabric side panels, defining a distal portion of the edges of both adjacent fabric side panels that extends past the first stitch;
a first bend in each of the adjacent fabric side panels, away from the other adjacent fabric side panel, to cover and extend past the distal portion of the adjacent fabric side panel; and
a second stitch that extends lengthwise through a portion of both adjacent fabric side panels that extends past the distal portion of the adjacent fabric side panel.

7. The elevated garden planter of claim 1, wherein each of the corner connectors has three tube engagers, wherein each of the tube engagers is configured to engage a corresponding one of the rigid tubes and to hold the corresponding rigid tubes in an orthogonal relationship relative to one another.

8. The elevated garden planter of claim 7, wherein a downward-facing one of the three tube engagers in each of the corner connectors is a tube portion with a tube portion slit that extends lengthwise along the tube portion from a distal end of the tube portion.

9. The elevated garden planter of claim 8, wherein each of the corner connectors is configured such that the tube portion slit in the tube portion of that corner connector aligns with a corresponding slit in a corresponding one of the rigid vertical tubes that is coupled to the tube engager of that corner connector,
wherein alignment of the tube portion slit with the corresponding slit in the corresponding one of the rigid vertical tubes results in the horizontal tubes that are connected to that corner connector being equally offset from the corresponding slit of the corresponding one of the rigid vertical tubes.

10. The elevated garden planter of claim 9, wherein each of the other two tube engagers in each of the corner connectors comprises:
a flat base that is perpendicular to an axis of that tube engager; and
a cross-shaped projection extending out from the flat base,
wherein only one arm of the cross extends radially outward relative to the axis all the way to an outer edge of the flat base, and
wherein the arm that extends radially outward all the way to the outer edge of the flat base aligns with and frictionally engages the slit in a corresponding one of the rigid horizontal tubes of the container that is connected to that tube engager.

11. The elevated garden planter of claim 1, wherein the support structure for the container comprises:
a platform;
a scaffold assembly configured to support the platform; and
a plurality of feet to support the scaffold assembly.

12. The elevated garden planter of claim 11, wherein each of the rigid vertical tubes extends into and held in place by a corresponding one of a plurality of holes in the platform.

13. The elevated garden planter of claim 11, wherein the scaffold assembly comprises:
- four cross braces, wherein each of the cross braces is a rigid, x-shaped frame with a knuckle at each corner of the x-shaped frame, wherein each knuckle comprises a pair of vertically-aligned tubes, wherein the vertically-aligned tubes in each knuckle are vertically-aligned with the vertically-aligned tubes in a corresponding one of the knuckles below it or above it, wherein the vertically-aligned tubes have vertical cylindrical openings that are sized to receive a leg tube;
- four of the leg tubes, wherein each of the leg tubes is a rigid, structural load bearing element that extends through the vertically-aligned tubes of an upper and a lower knuckle of two adjacent cross braces, wherein a vertical separation is between the vertically-aligned tubes in each knuckle, and wherein a selected one of the vertically-aligned tubes on a first one of the cross braces is positioned within the vertical separation between and in direct physical contact with two of the vertically-aligned tubes on a second one of the cross braces, adjacent to the first one of the cross braces;
- four upper spacer tubes, wherein each upper spacer tube is aligned between the upper and lower knuckle of the two adjacent cross braces,
- four lower spacer tubes, wherein each lower space tube is aligned with, below, and in direct physical contact with the lower knuckle of the two adjacent cross braces, wherein, in assembly, each leg tube extends through one of the upper spacer tubes, through a corresponding aligned one of the lower spacer tubes, through the vertically-aligned tubes in the upper and lower knuckles of the two adjacent cross braces, into a foot at a lower end thereof, and into a top cap at a top end thereof.

14. The elevated garden planter of claim 11, further comprising one and only one drain opening in the platform.

15. The elevated garden planter of claim 11, wherein the platform comprises:
- side walls that surround a surface;
- a drainage grid formed in the surface.

16. The elevated garden planter of claim 15, further comprising:
- recessed connection points in each of the side walls, wherein each recessed connection point is configured to receive and engage a connection clip for joining and aligning the elevated garden planter with another elevated garden planter.

17. The elevated garden planter of claim 16, further comprising:
- a plurality of ribs that extend inwardly from each of the side walls of the platform to prevent the container fabric portion of the container from touching the side walls of the platform to ensure that all irrigation runoff is captured and to stiffen the vertical side walls of the platform.

18. The elevated garden planter of claim 1, further comprising soil in the container.

19. A method of creating an elevated garden planter, the method comprising:
- obtaining a plurality of rigid tubes, wherein each rigid tube has a slit that extends lengthwise along the rigid tube;
- obtaining a plurality of corner connectors;
- obtaining a plurality of fabric side panels connected to a fabric bottom panel, wherein a hem is at an upper edge of each respective one of the fabric side panels, and a seam attaches each respective one of the fabric side panels to an adjacent one of the fabric side panels;
- coupling each of the seams and each of the hems to a corresponding one of the rigid tubes by sliding the seam or hem into the corresponding rigid tube such that the associated pair of fabric side panels extends out from each respective one of the rigid tubes that contains one of the seams, and such that an associated one of the fabric side panel extends out from each respective one of the rigid tubes that contains one of the hems; and
- coupling the rigid tubes together with the corner connectors so that the rigid tubes that contain the hems are disposed horizontally and the rigid tubes that contain the seams are disposed vertically, wherein each of the fabric side panels comprises a rectangular main portion with truncated lower corners, and a top extension portion that extends in an upward direction from the rectangular main portion and is centered along a top edge of the rectangular main portion, the method comprising:
- forming each of the hems, wherein forming each of the hems comprises:
  - forming a first fold in a downward direction in the corresponding extension portion, wherein fabric that extends distally past the first fold defines a folded down part of the extension portion;
  - placing a first lengthwise stich through the folded down part of the extension portion and a non-folded down part of the extension portion;
  - forming a second fold in an upward directed in the corresponding extension portion, wherein fabric that extends distally past the second fold defines a folded up part of the extension portion; and
  - placing a second lengthwise stitch through the folded up part of the extension portion, the folded down part of the extension portion, and the non-folded down part of the extension portion; and
- forming each of the seams, wherein forming each of the seams comprises:
  - placing a first stitch that extends lengthwise through both the adjacent side panels along aligned edges of the adjacent fabric side panels, defining a distal portion of the edges of both adjacent fabric side panels that extends past the first stitch;
  - forming a first bend in each of the adjacent fabric side panels, away from the other adjacent fabric side panel, to cover and extend past the distal portion of the adjacent fabric side panel; and
  - placing a second stitch that extends lengthwise through a portion of both adjacent fabric side panels that extends past the distal portion of the adjacent fabric side panel.

20. The method of claim 19, further comprising:
- obtaining a support structure that comprises a platform, a scaffold assembly configured to support the platform, and a plurality of feet to support the scaffold; and
- positioning each of the vertically disposed rigid tubes with a corresponding one of a plurality of holes in the platform.

21. The method of claim 19, further comprising adding soil into the elevated garden planter.

22. An elevated garden planter comprising:
- a container; and
- a support structure for the container,
  wherein the container comprises:
  - a frame portion; and
  - a fabric portion supported by the frame portion, wherein the frame portion of the container comprises:
a plurality of rigid horizontal tubes;
a plurality of rigid vertical tubes; and
a plurality of corner connectors, wherein each corner connector connects one of the horizontal tubes to a different one of the horizontal tubes and to one of the rigid vertical tubes at an upper corner of the frame,
wherein each rigid tube has a slit that extends lengthwise along the rigid tube;
wherein the fabric portion of the container comprises:
a plurality of fabric side panels; and
a fabric bottom panel,
a hem at an upper edge of each respective one of the fabric side panels, and
a seam attaching each respective one of the fabric side panels to an adjacent one of the fabric side panels;
wherein each respective hem is located inside a corresponding one of the rigid horizontal tubes with an associated one of the fabric side panels extending through the slit of that rigid horizontal tube,
wherein each respective seam is located inside a corresponding one of the rigid vertical tubes with the associated adjacent fabric side panels extending through the slit of that rigid vertical tube,
wherein each of the corner connectors has three tube engagers, wherein each of the tube engagers is configured to engage a corresponding one of the rigid tubes and to hold the corresponding rigid tubes in an orthogonal relationship relative to one another, and
wherein a downward-facing one of the three tube engagers in each of the corner connectors is a tube portion with a tube portion slit that extends lengthwise along the tube portion from a distal end of the tube portion.

23. The elevated garden planter of claim 22, wherein each of the corner connectors is configured such that the tube portion slit in the tube portion of that corner connector aligns with a corresponding slit in a corresponding one of the rigid vertical tubes that is coupled to the tube engager of that corner connector,
wherein alignment of the tube portion slit with the corresponding slit in the corresponding one of the rigid vertical tubes results in the horizontal tubes that are connected to that corner connector being equally offset from the corresponding slit of the corresponding one of the rigid vertical tubes.

24. The elevated garden planter of claim 23, wherein each of the other two tube engagers in each of the corner connectors comprises:
a flat base that is perpendicular to an axis of that tube engager; and
a cross-shaped projection extending out from the flat base,
wherein only one arm of the cross extends radially outward relative to the axis all the way to an outer edge of the flat base, and
wherein the arm that extends radially outward all the way to the outer edge of the flat base aligns with and frictionally engages the slit in a corresponding one of the rigid horizontal tubes of the container that is connected to that tube engager.

25. An elevated garden planter comprising:
a container; and
a support structure for the container,
wherein the container comprises:
a frame portion; and
a fabric portion supported by the frame portion,
wherein the frame portion of the container comprises:
a plurality of rigid horizontal tubes;
a plurality of rigid vertical tubes; and
a plurality of corner connectors, wherein each corner connector connects one of the horizontal tubes to a different one of the horizontal tubes and to one of the rigid vertical tubes at an upper corner of the frame,
wherein each rigid tube has a slit that extends lengthwise along the rigid tube;
wherein the fabric portion of the container comprises:
a plurality of fabric side panels; and
a fabric bottom panel,
a hem at an upper edge of each respective one of the fabric side panels, and
a seam attaching each respective one of the fabric side panels to an adjacent one of the fabric side panels;
wherein each respective hem is located inside a corresponding one of the rigid horizontal tubes with an associated one of the fabric side panels extending through the slit of that rigid horizontal tube,
wherein each respective seam is located inside a corresponding one of the rigid vertical tubes with the associated adjacent fabric side panels extending through the slit of that rigid vertical tube,
wherein the support structure for the container comprises:
a platform;
a scaffold assembly configured to support the platform; and
a plurality of feet to support the scaffold assembly,
wherein the scaffold assembly comprises:
four cross braces, wherein each of the cross braces is a rigid, x-shaped frame with a knuckle at each corner of the x-shaped frame, wherein each knuckle comprises a pair of vertically-aligned tubes, wherein the vertically-aligned tubes in each knuckle are vertically-aligned with the vertically-aligned tubes in a corresponding one of the knuckles below it or above it, wherein the vertically-aligned tubes have vertical cylindrical openings that are sized to receive a leg tube;
four of the leg tubes, wherein each of the leg tubes is a rigid, structural load bearing element that extends through the vertically-aligned tubes of an upper and a lower knuckle of two adjacent cross braces, wherein a vertical separation is between the vertically-aligned tubes in each knuckle, and wherein a selected one of the vertically-aligned tubes on a first one of the cross braces is positioned within the vertical separation between and in direct physical contact with two of the vertically-aligned tubes on a second one of the cross braces, adjacent to the first one of the cross braces;
four upper spacer tubes, wherein each upper spacer tube is aligned between the upper and lower knuckle of the two adjacent cross braces,
four lower spacer tubes, wherein each lower space tube is aligned with, below, and in direct physical contact with the lower knuckle of the two adjacent cross braces,
wherein, in assembly, each leg tube extends through one of the upper spacer tubes, through a corresponding aligned one of the lower spacer tubes, through the vertically-aligned tubes in the upper and lower knuckles of the two adjacent cross braces, into a foot at a lower end thereof, and into a top cap at a top end thereof.

26. An elevated garden planter comprising:
a container; and
a support structure for the container,
   wherein the container comprises:
      a frame portion; and
      a fabric portion supported by the frame portion,
   wherein the frame portion of the container comprises:
      a plurality of rigid horizontal tubes;
      a plurality of rigid vertical tubes; and
      a plurality of corner connectors, wherein each corner connector connects one of the horizontal tubes to a different one of the horizontal tubes and to one of the rigid vertical tubes at an upper corner of the frame,
      wherein each rigid tube has a slit that extends lengthwise along the rigid tube;
   wherein the fabric portion of the container comprises:
      a plurality of fabric side panels; and
      a fabric bottom panel,
      a hem at an upper edge of each respective one of the fabric side panels, and
      a seam attaching each respective one of the fabric side panels to an adjacent one of the fabric side panels;
   wherein each respective hem is located inside a corresponding one of the rigid horizontal tubes with an associated one of the fabric side panels extending through the slit of that rigid horizontal tube,
   wherein each respective seam is located inside a corresponding one of the rigid vertical tubes with the associated adjacent fabric side panels extending through the slit of that rigid vertical tube,
   wherein the support structure for the container comprises:
      a platform;
      a scaffold assembly configured to support the platform; and
      a plurality of feet to support the scaffold assembly, and
   wherein the platform comprises:
      side walls that surround a surface;
      a drainage grid formed in the surface.

27. The elevated garden planter of claim 26, further comprising:
   recessed connection points in each of the side walls, wherein each recessed connection point is configured to receive and engage a connection clip for joining and aligning the elevated garden planter with another elevated garden planter.

28. The elevated garden planter of claim 27, further comprising:
   a plurality of ribs that extend inwardly from each of the side walls of the platform to prevent the container fabric portion of the container from touching the side walls of the platform to ensure that all irrigation runoff is captured and to stiffen the vertical side walls of the platform.

* * * * *